United States Patent
Kim et al.

(10) Patent No.: US 11,508,248 B2
(45) Date of Patent: Nov. 22, 2022

(54) METHOD FOR PREDICTING COLLISION AND AVOIDING CONFLICT BETWEEN MULTIPLE MOVING BODIES

(71) Applicant: IUCF-HYU(INDUSTRY-UNIVERSITY COOPERATION FOUNDATION HANYANG UNIVERSITY, Seoul (KR)

(72) Inventors: Deok-Soo Kim, Seoul (KR); Je Hyun Cha, Anseong-si (KR); Joong Hyun Ryu, Suwon-si (KR); Mok Won Lee, Seoul (KR); Chan Young Song, Seongnam-si (KR); Young Song Cho, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 448 days.

(21) Appl. No.: 16/618,271

(22) PCT Filed: May 29, 2018

(86) PCT No.: PCT/KR2018/006052
§ 371 (c)(1),
(2) Date: Nov. 29, 2019

(87) PCT Pub. No.: WO2018/221915
PCT Pub. Date: Dec. 6, 2018

(65) Prior Publication Data
US 2021/0166572 A1    Jun. 3, 2021

(30) Foreign Application Priority Data

May 30, 2017 (KR) .................. 10-2017-0066948
May 28, 2018 (KR) .................. 10-2018-0060257

(51) Int. Cl.
*G08G 9/02* (2006.01)
*G06F 30/20* (2020.01)
*G06F 111/10* (2020.01)

(52) U.S. Cl.
CPC ............ *G08G 9/02* (2013.01); *G06F 30/20* (2020.01); *G06F 2111/10* (2020.01)

(58) Field of Classification Search
CPC ....... G08G 9/02; G06F 30/20; G06F 2111/10; G06F 30/25; G06T 2210/12; G06T 13/20; G06T 17/20; G06T 2210/21
See application file for complete search history.

(56) References Cited

U.S. PATENT DOCUMENTS

| | | | |
|---|---|---|---|
| 2004/0010346 A1* | 1/2004 | Stewart | ............... G06F 3/016 700/255 |
| 2010/0183226 A1 | 7/2010 | Kim et al. | |
| 2015/0134295 A1 | 5/2015 | Kim et al. | |

FOREIGN PATENT DOCUMENTS

| KR | 10-2008-0024529 A | 3/2008 |
|---|---|---|
| KR | 10-2010-0064287 A | 6/2010 |

(Continued)

OTHER PUBLICATIONS

International Search Report for PCT/KR2018/006052 dated Aug. 29, 2018 (PCT/ISA/210).

*Primary Examiner* — Kabir A Timory
(74) *Attorney, Agent, or Firm* — Sughrue Mion, PLLC

(57) ABSTRACT

Disclosed is a method for predicting collisions and conflicts between multiple moving bodies. A method for predicting and avoiding collisions and conflicts between multiple moving bodies comprises the steps of: creating objects by modeling the shape of each of multiple moving bodies; creating two-dimensional circles by modeling the objects by using size information of the objects; modeling the two-dimensional circles into moving disks by using at least one (Continued)

of the moving speeds of the moving bodies, the monitoring time window for the moving bodies, and the size information of the two-dimensional circles; computing a Voronoi diagram between the moving disks and calculating edges of the Voronoi diagram; and during the monitoring time window for the moving bodies, calculating a flipping event in which at least one of the edges of the Voronoi diagram is converted into a vertex and then converted into another edge, and a collision event by which a collision between a pair of moving disks defining an edge of the Voronoi diagram is predicted, and calculating whether actual collisions occur between moving disks triggering the flipping event and between moving disks triggering the collision event, in chronological order of the occurrence of the flipping event and the collision event.

23 Claims, 19 Drawing Sheets

(56) References Cited

FOREIGN PATENT DOCUMENTS

| KR | 10-2012-0089517 A | 8/2012 |
| KR | 10-2014-0084813 A | 7/2014 |
| KR | 10-2015-0048953 A | 5/2015 |
| KR | 10-1533946 B1 | 7/2015 |

* cited by examiner

METHOD FOR PREDICTING COLLISION AND AVOIDING CONFLICT BETWEEN MULTIPLE MOVING BODIES

CROSS REFERENCE TO RELATED APPLICATIONS

This application is a National Stage of International Application No. PCT/KR2018/006052 filed May 29, 2018, claiming priority based on Korean Patent Application No. 10-2017-0066948, filed May 30, 2017 and Korean Patent Application No. 10-2018-0060257 filed May 28, 2018.

TECHNICAL FIELD

The present invention relates to a method for predicting collision between multiple moving bodies and a method for avoiding conflict between multiple moving bodies, and more particularly, to a method for predicting and avoiding collision between geometric shapes using dynamic data of the geometric shapes and topology information of a Voronoi diagram by modeling multiple moving bodies into two-dimensional or three-dimensional geometric shapes and computing the Voronoi diagram for the geometric shapes.

BACKGROUND ART

Similar to traffic accidents on the land that cause many casualties, collision accidents frequently occur between ships on the sea and cause many casualties. In addition, collision accidents often occur between aircrafts in the sky, resulting in very many deaths. A typical example was air collision over Uberlingen, Germany, on Jul. 1, 2002, resulting in the death of 71 passengers in both aircrafts. In addition, collisions occasional occur between air planes moving along the runway on the ground. In recent years, unmanned aircrafts such as drones are more frequently used, and collisions between the drones and airliners or between the drones and helicopters also frequently occur. (Example: the drone/passenger plane crash in Quebec, Canada on Oct. 16, 2017). Thus, massive casualties may be resulted when failing to accurately predict conflicts (or conjunctions) or collisions between the aircrafts or between ships.

As a method for predicting collision and conflict between multiple moving bodies, a method for sampling positions of objects in a unit of a pair at a predetermined time window and checking whether the sampled positions intersect has been used. However, the above method has a risk of failing to detect the conflict depending on the sampling method and the sampling frequency even though there is an actual conflict risk, and the amount of calculations may increase greatly to reduce the risk. For example, if the sampling frequency is M for N moving bodies, the calculation amount of the conventional method is $O(N^2M^2)$. In this case, the amount of calculation may be greatly increased even when the sampling frequency is slightly increased, so a large-scale supercomputer is required for predicting the collision and conflict of the moving bodies.

In order to improve the above elementary method, there is provided a method for efficiently determining a collision between two moving bodies by using a segment tree based on a sorted binary tree [Bentley J L, Wood D. An optimal worst case algorithm for reporting intersections of rectangles. IEEE Transactions on Computers. 1980 Jul. 1(7): 571-7.] ($O(N \log N)$ time to build a binary tree and average time of $O(\log N)$ time to find the two nearest moving bodies). However, this method is specialized only for collisions between two moving bodies and depends on the coordinate system.

In contrast, the method proposed in the present invention is independent from the coordinate system, and can efficiently analyze the conflict between any number of moving bodies as well as between two or three moving bodies ($O(N \log N)$ time for preprocessing to predict the collision and conflict and average $O(\log N)$ time to deal with each subsequent event).

In addition, the method proposed in the present invention can replay the situation of the collision and conflict through the event history for collision avoidance and other analysis even after the calculation for predicting the collision and conflict is completed, but the above method does not replay the situation. The rapid replay is an important feature because it allows to repeat various analyzes for future situations.

In addition, there have been studies on how to calculate the Voronoi diagram with respect to a movable point set without considering the size of each moving body. [Roos T. Voronoi diagrams over dynamic scenes. Discrete Applied Mathematics. 1993 Jun. 10; 43(3):243-59.]. However, this method is difficult to accurately predict the collision and conflict because the size of the moving body may not be accurately reflected.

DISCLOSURE

Technical Problem

The present invention provides a method for predicting and avoiding collisions and conflicts of multiple moving bodies that linearly move with a small amount of calculation.

In addition, the present invention provides a method for predicting and avoiding collisions and conflicts of multiple moving bodies by approximating the movement of multiple moving bodies that linearly move into a plurality of linear movements.

Further, the present invention provides a method for accurately determining collisions and conflicts of the moving bodies without missing.

Technical Solution

According to the present invention, there is provided a method for predicting and avoiding collision between moving bodies, the method including: creating objects by modeling a shape of each of multiple moving bodies; creating two-dimensional circles by modeling the objects by using size information of the objects; modeling the two-dimensional circles into moving disks by using at least one of moving speeds of the moving bodies, a monitoring time window for the moving bodies, and the size information of the two-dimensional circles; computing a Voronoi diagram between the moving disks to calculate edges of the Voronoi diagram; and during the monitoring time window for the moving bodies, calculating a flipping event in which at least one of the edges of the Voronoi diagram is converted into a vertex and then converted again into the edge, and a collision event for predicting a collision between a pair of moving disks defining an edge of the Voronoi diagram, and calculating whether actual collisions occur between moving disks triggering the flipping event and between moving disks triggering the collision event, in a chronological order of an occurrence time of the flipping event and the collision event.

In addition, the method may further include updating information of the Voronoi diagram where the flipping event occurs, wherein the updating of the information of the Voronoi diagram where the flipping event occurs may include: redefining the Voronoi diagram with respect to the moving disks defining edges of the Voronoi diagram where the flipping event occurs and edges of other Voronoi diagrams connected thereto; recalculating an occurrence time of the flipping event in relation to the edges of the Voronoi diagram where the flipping event occurs and the edges of other Voronoi diagram connected thereto; recalculating an occurrence time of the collision event between a pair of moving disks defining the edge of the Voronoi diagram where the flipping event occurs; and recalculating the actual collision between the moving disks triggering the flipping event and between the moving disks triggering the collision event, in a chronological order of the recalculated occurrence time of the flipping event and the collision event, and wherein an information update of the Voronoi diagram where the flipping event occurs is repeated during the monitoring time window for the moving bodies, and is terminated when neither the flipping event nor the collision event occurs.

In addition, the method may further include updating information of the Voronoi diagram where the collision event occurs, wherein the updating of the information of the Voronoi diagram where the collision event occurs may include: recalculating an occurrence time of the collision event between the pair of moving disks triggering the collision event and between another pair of moving disks defining the edges of the Voronoi diagram; recalculating an occurrence time of the flipping event with respect to the edge of the Voronoi diagram defined by a pair of moving disks triggering the collision event, the edges of the Voronoi diagram defined by another pair of moving disks different from the pair of the moving disks triggering the collision event, and the edges of the Voronoi diagram defined by the another pair of moving disks; and recalculating the actual collision between the moving disks triggering the collision event and between the moving disks triggering the flipping event, in a chronological order of the recalculated occurrence time of the collision event and the flipping event, and wherein an information update of the Voronoi diagram where the collision event occurs is repeated during the monitoring time window for the moving bodies, and is terminated when neither the flipping event nor the collision event occurs.

In addition, the creating of the two-dimensional circle may include generating a circumscribed circle that circumscribes each of the objects.

In addition, the creating of the moving disks may include determining a radius of the moving disks by Equation 1.

$$R = r + V_{max} \cdot t_p + \delta \quad \text{[Equation 1]}$$

(where R is a radius of moving disks, r is a radius of a two-dimensional circle, $V_{max}$ is a maximum velocity of a moving body, $t_p$ is a calculation time for predicting collision and conflict of moving bodies, and $\delta$ is a safety factor).

In addition, the calculating of the actual collision between the moving disks may include determining whether the objects of the moving disks collide with each other.

In addition, the determining whether the objects of the moving disks collide with each other includes modeling the objects by a plurality of inscribed circles inscribed in each of the objects, and determining the collision of the moving bodies in a unit of the inscribed circle.

In addition, the determining whether the objects of the moving disks collide with each other may include: approximating a nonlinear moving path of the moving bodies into a plurality of linear moving paths; modeling the objects into a geometric shape that includes objects turned at a turning position and a turning angle when the turning position and the turning angle of the moving bodies on the approximated linear moving paths are known; and determining the collision between the geometric shapes.

In addition, the moving bodies may move along their respective trajectories, and calculating the actual collision between the moving disks may include: extracting the moving disks nearest to the edge of the Voronoi diagram as collision prediction objects; and determining the collision of the collision prediction objects by analyzing moving speeds of the collision prediction objects.

In addition, in the calculating of the actual collision between the moving disks, when radiuses of a first collision prediction object A and a second collision prediction object B of the collision prediction objects are $r_A$ and $r_B$, respectively, center point positions of the first collision prediction object A and the second collision prediction object B from a first reference time point are $(A_x, A_y)$ and $(B_x, B_y)$, respectively, and velocities of the first collision prediction object A and the second collision prediction object B moving along the trajectory are $V_A = (v_x, v_y)$, $U_B = (u_x, u_y)$, respectively, if an estimated position of the first collision prediction object A is A(t) and an estimated position of the second collision prediction object B is B(t) after t time elapses, the collision between the first collision prediction object A and the second collision prediction object B may be calculated through Equation 2 below.

$$d(t) = |A(t) - B(t)| \sqrt{(w_x^2 + w_y^2)t^2 + 2(w_x r_x + w_y r_y)t + (r_x^2 + r_y^2)} \quad \text{[Equation 2]}$$

($r_x$ is $A_x - B_x$, $r_y$ is $A_y - B_y$, $w_x$ is $v_x - u_x$, and $w_y$ is $v_y - u_y$).

According to another embodiment, there is provided a method for predicting and avoiding collision between moving bodies, the method including: creating objects by modeling a shape of each of multiple moving bodies; modeling the objects into three-dimensional spheres by using size information of the objects; creating moving spheres by modeling the three-dimensional spheres using at least one of moving speeds of the moving bodies, a monitoring time window for the moving bodies, and the size information of the three-dimensional spheres; computing a Voronoi diagram between the moving spheres to calculate faces, edges and vortexes of the Voronoi diagram; and during the monitoring time window for the moving bodies, calculating an edge flipping event in which the edges of the Voronoi diagram are converted into the faces of the Voronoi diagram, a face flipping event in which the faces of the Voronoi diagram are converted into the edges of the Voronoi diagram, and a collision event for predicting a collision between a pair of moving spheres defining a face of the Voronoi diagram, and calculating whether actual collisions occur between the moving spheres triggering the edge flipping event, between moving spheres triggering the face flipping event, and between moving spheres triggering the collision event, in a chronological order of an occurrence time of the edge flipping event, the face flipping event and the collision event.

In addition, the method may further include updating information of the Voronoi diagram where the edge flipping event occurs, wherein the updating of the information of the Voronoi diagram where the edge flipping event occurs may include: redefining the Voronoi diagram with respect to the moving spheres that define the face of the Voronoi diagram after the edge flipping event occurs and the edges of the Voronoi diagram that abut vertices and make up the face; recalculating an occurrence of the edge flipping event with respect to the edges of the Voronoi diagram that abut the vertices; recalculating an occurrence of the face flipping event with respect to the face of the Voronoi diagram after the edge flipping event occurs; recalculating an occurrence of the collision event between the moving spheres defining the face of the Voronoi diagram created after the recalculation of the occurrence of the edge flipping event; and recalculating the actual collision between the moving spheres triggering the recalculated edge flipping event, between the moving spheres triggering the recalculated face flipping event and between the moving spheres triggering the recalculated collision event, in a chronological order of the recalculated occurrence time of the edge flipping event, the face flipping event and the collision event, and wherein the updating of the information of the Voronoi diagram where the edge flipping event occurs may be repeated during the monitoring time window of the moving bodies, and may be terminated when the edge flipping event, the face flipping event and the collision event do not occur.

In addition, the method may further include updating information of the Voronoi diagram where the face flipping event occurs, wherein the updating of the information of the Voronoi diagram where the face flipping event occurs may include: redefining the Voronoi diagram with respect to the moving spheres that define the edge of the Voronoi diagram where the face flipping event occurs and the edges of the Voronoi diagram that abut the edge of the Voronoi diagram where the face flipping event occurs; recalculating an occurrence of the edge flipping event with respect to the edge of the Voronoi diagram where the face flipping event occurs and the edge of the Voronoi diagram connected to the edge of the Voronoi diagram where the face flipping event occurs; recalculating an occurrence of the face flipping event with respect to the faces of the Voronoi diagram connected to the edge of the of the Voronoi diagram where the face flipping event occurs; recalculating an occurrence of the collision event between the moving spheres defining the face of the Voronoi diagram created after the recalculation of the occurrence of the edge flipping event; and recalculating the actual collision between the moving spheres triggering the recalculated edge flipping event, between the moving spheres triggering the recalculated face flipping event and between the moving spheres triggering the recalculated collision event, in a chronological order of the recalculated occurrence time of the edge flipping event, the face flipping event and the collision event, and wherein the updating of the information of the Voronoi diagram where the edge flipping event occurs may be repeated during the monitoring time window of the moving bodies, and may be terminated when the edge flipping event, the face flipping event and the collision event do not occur.

In addition, the method may further include updating information of the Voronoi diagram where the collision event occurs, wherein the updating of the information of the Voronoi diagram where the collision event occurs may include: recalculating an occurrence of the collision event with respect to a pair of moving spheres triggering the collision event and other moving spheres defining faces of the Voronoi diagram in association with the pair of moving spheres; recalculating an occurrence of the edge flipping event and the face flipping event with respect to the face of the Voronoi diagram which abuts vertices of the Voronoi diagram included in the faces of the Voronoi diagram defined by the pair of moving spheres and other moving spheres or with respect to the edge of the Voronoi diagram; and recalculating the actual collision between the moving spheres triggering the recalculated collision event, between the moving spheres triggering the recalculated edge flipping event and between the moving spheres triggering the recalculated face flipping event, in a chronological order of the recalculated occurrence time of the collision event, the edge flipping event, and the face flipping event, and wherein the updating of the information of the Voronoi diagram where the collision event occurs is repeated during the monitoring time window of the moving bodies, and is terminated when the edge flipping event, the face flipping event and the collision event do not occur.

In addition, the creating of the three-dimensional sphere may include creating a sphere that circumscribes each of the objects.

In addition, the creating of the moving spheres may include determining a radius of the moving spheres by Equation 1.

$$R = r + V_{max} \cdot t_p + \delta \qquad [\text{Equation 1}]$$

(where R is a radius of moving spheres, r is a radius of a three-dimensional sphere, $V_{max}$ is a maximum velocity of a moving body, $t_p$ is a calculation time for predicting collision and conflict of moving bodies, and $\delta$ is a safety factor).

In addition, the calculating of the actual collision between the moving spheres further may include determining whether the objects of the moving spheres collide with each other.

In addition, the determining whether the objects of the moving spheres collide with each other may include modeling the objects with a plurality of inscribed spheres inscribed in each of the objects, and predicting collision of the moving bodies in a unit of the inscribed sphere.

In addition, the determining whether the objects of the moving spheres collide with each other may include: approximating a nonlinear moving path of the moving bodies into a plurality of linear moving paths; modeling the objects into a geometric shape that includes objects turned at a turning position and a turning angle when the turning position and the turning angle of the moving bodies on the approximated linear moving paths are known; and predicting the collision between the geometric shapes.

In addition, the moving bodies may move along their respective trajectories, and the calculating of the actual collision between the moving spheres includes extracting the spheres nearest to the face of the Voronoi diagram as collision prediction objects and analyzing a moving speed of the collision prediction objects to determine whether the collision prediction objects collide with each other.

In addition, the method may further include: a primary collision determination step of creating a first approximate trajectory by approximating the trajectories of the moving spheres into n linear sections, primarily correcting sizes of the moving spheres by reflecting an error between the trajectories of the moving spheres and the first approximate trajectory, and determining whether the moving spheres having the sizes, which are primarily corrected, collide with each other; and a secondary collision determination step of, when the collision occurs between the moving spheres having the sizes, which are primarily corrected, in the primary collision determination step for the moving spheres, creating a second approximate trajectory by approximating the trajectories of the moving spheres into m linear sections greater than the n linear sections, secondarily correcting the sizes of the moving spheres by reflecting an error between the trajectories of the moving spheres and the second approximate trajectory, and determining whether the moving spheres having the sizes, which are secondarily corrected, collide with each other, and wherein each of the primary and secondary collision determination steps for the moving spheres may include: calculating faces of the Voronoi diagram by calculating a diagram between the moving spheres having the corrected sizes; extracting the moving spheres nearest to the face of the Voronoi diagram as collision prediction objects from among the moving spheres having the corrected size; and determining the collision by analyzing moving speeds of the collision prediction objects.

In addition, in the calculating of the actual collision between the moving spheres, when radiuses of a first collision prediction object A and a second collision prediction object B of the collision prediction objects are $r_A$ and $r_B$, respectively, center point positions of the first collision prediction object A and the second collision prediction object B from a first reference time point are $(A_x, A_y, A_z)$ and $(B_x, B_y, B_z)$, respectively, and velocities of the first collision prediction object A and the second collision prediction object B moving along the trajectory are $V_A=(v_x, v_y, v_z)$, $U_B=(u_x, u_y, u_z)$, respectively, if an estimated position of the first collision prediction object A is A(t) and an estimated position of the second collision prediction object B is B(t) after t time elapses, the collision between the first collision prediction object A and the second collision prediction object B may be calculated through Equation 2 below.

[Equation 2]

$$d(t) = |A(t) - B(t)| = \sqrt{(w_x^2 + w_y^2 + w_z^2)t^2 + 2(w_x r_x + w_y r_y + w_z r_z)t + (r_x^2 + r_y^2 + r_z^2)}$$

($r_x$ is $A_x$-$B_x$, $r_y$ is $A_y$-$B_y$, $r_z$ is $A_z$-$B_z$, $w_x$ is $v_x$-$u_x$, $w_y$ is $v_y$-$u_y$, $w_z$ is $v_z$-$u_z$)

In addition, the present invention may provide a computer-readable recording medium that stores a program for executing a method for predicting and avoiding collisions between the above-described moving bodies.

Advantageous Effects

According to the present invention, since the collision and conflict are determined only for the moving bodies triggering the flipping event and the collision event by applying the Voronoi diagram, the calculation amount for the collision and conflict prediction for the multiple moving bodies can be minimized.

In addition, according to the present invention, when the two-dimensional moving bodies collide, they necessarily have the edge of the Voronoi diagram, and when the three-dimensional moving bodies collide, they necessarily have the face of the Voronoi diagram, so it is possible to accurately predict the actual collision without missing by confirming the objects that define the edge of the Voronoi diagram (collision between two-dimensional moving bodies and conflict prediction) or faces of the Voronoi diagram (collision between three-dimensional moving bodies and conflict prediction).

Further, according to the present invention, when three two-dimensional moving bodies are close to each other, a vertex of the Voronoi diagram is defined between the moving bodies, and when four or more moving bodies are close to each other in a two-dimension, a substructure of the Voronoi diagram can be defined. In the two-dimension, the Voronoi diagram consists of vertices, edges, and faces (areas having a polygonal shape and opened or closed), in which the substructure of the Voronoi diagram signifies a subset of Voronoi diagram that includes at least one of the vertices, edges, and faces of the Voronoi diagram.

In the case of the three-dimensional moving body, similarly to two-dimensional moving body, when three three-dimensional moving bodies are close to each other, they have an edge of the Voronoi diagram between the moving bodies, when four moving bodies are close to each other in a three-dimension, a vertex of the Voronoi diagram is defined between the moving bodies, and when five moving bodies are close to each other, a substructure of the Voronoi diagram can be defined. In the three-dimension, the Voronoi diagram consists of vertices, edges, faces and cells (a polygon bound by faces of the Voronoi diagram and opened or closed), in which the substructure of the Voronoi diagram signifies a subset of Voronoi diagram that includes at least one of the vertices, edges, faces and cells of the Voronoi diagram.

As described above, if the Voronoi diagram between the moving bodies is calculated, the conflict between three, four or more moving bodies as well as the collision between the two moving bodies can be accurately and efficiently predicted. Therefore, the method proposed in the present invention can efficiently analyze the conflict between multiple moving bodies as well as between two or three moving bodies.

BEST MODE

Figure 1:
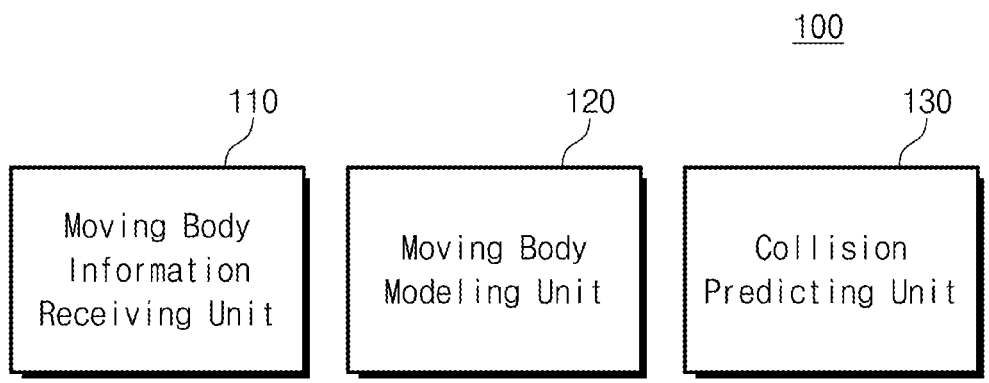
FIG. 1 is a view illustrating a system for predicting and avoiding collision and conflict between moving bodies according to one embodiment of the present invention.

A method for predicting and avoiding collision between multiple moving bodies according to the present invention includes: creating objects by modeling a shape of each of multiple moving bodies; creating two-dimensional circles by modeling the objects by using size information of the objects; modeling the two-dimensional circles into moving disks by using at least one of moving speeds of the moving bodies, a monitoring time window for the moving bodies, and the size information of the two-dimensional circles; computing a Voronoi diagram between the moving disks to calculate edges of the Voronoi diagram; and during the monitoring time window for the moving bodies, calculating a flipping event in which at least one of the edges of the Voronoi diagram is converted into a vertex and then converted again into the edge, and a collision event for predicting a collision between a pair of moving disks defining an edge of the Voronoi diagram, and calculating whether actual collisions occur between moving disks triggering the flipping event and between moving disks triggering the collision event, in a chronological order of an occurrence time of the flipping event and the collision event.

MODE FOR INVENTION

Hereinafter, preferred embodiments of the present invention will be described in detail with reference to the accompanying drawings. However, the technical spirit of the present invention is not limited to the embodiments, but may be realized in different forms. The embodiments introduced here are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present invention, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combination thereof described in the specification are present, and may be understood that one or more other features, numbers, step, elements, or combinations thereof may be added. In addition, the term "connection" used herein may include the meaning of indirectly connecting a plurality of components, and directly connecting a plurality of components.

Further, in the following description of the present invention, a detailed description of known functions and configurations incorporated herein will be omitted when it may make the subject matter of the present invention unnecessarily unclear.

The present invention provides a method for predicting a risk of conflict and collision between moving objects (hereinafter referred to as 'moving bodes') and avoiding the collision. The moving body may include all high-speed or low-speed moving bodies, such as an aircraft, a ship, a submarine, a satellite, a drone, an automobile, etc., and the operation mode of the moving body may include a manned or an unmanned mode. In addition, the moving body may include not only objects having known moving paths such as a satellite moving around the earth, but also objects having unknown moving paths, however, it is possible to measure the instantaneous position, moving direction and speed such as an aircraft, an autonomous car, a drone, a submarine, a ship, etc. The moving path of the moving body may include a linear path and a nonlinear path. According to the present invention, the nonlinear path may be approximated into a plurality of linear paths. The number of linear paths to be approximated may be determined according to a user's setting, and it is assumed that the moving bodies move along the approximated linear paths. The moving body may move in a constant velocity linear motion in each section of the linear path and the approximated linear path described above.

In the present invention, in order to predict the collision between the moving bodies and to avoid the collision, dynamics data of the moving bodies are required. The dynamic data may be measured through the Global Navigation Satellite System (GNSS) and collected by an appropriate method.

According to an embodiment, the dynamic data measured through the GNSS is information including the instantaneous position and the moving speed of the moving body, in which the dynamic data of the aircraft may be collected by using an Automatic Dependent Surveillance Broadcast (ADS-B), and the dynamic data of the ship may be collected by using an Automatic Identification System (AIS). The dynamic data of the drone may be collected by using a wireless communication technology, such as Wi-Fi, or by using the ADS-B. The dynamic data of the autonomous car may be collected by using V2X, which is a communication link of a vehicular ad hoc network (VANET) that enables communication between cars.

Figure 2:
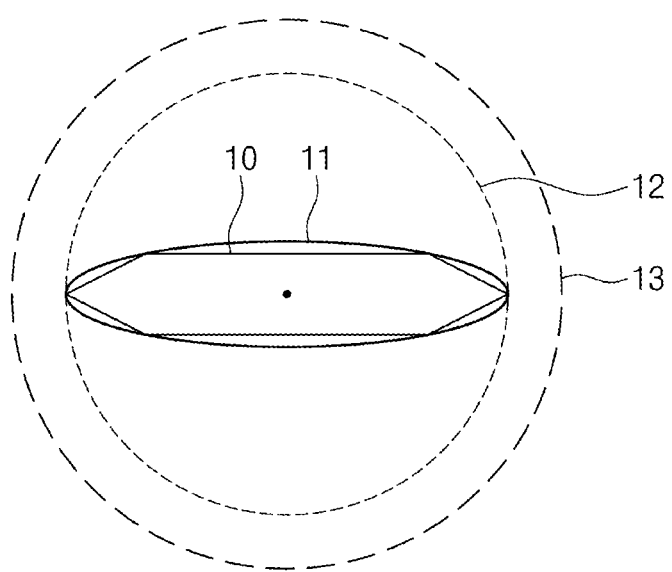
FIGS. 2 to 4 are views illustrating a method for modeling moving bodies by a moving body modeling unit.
Figure 3:
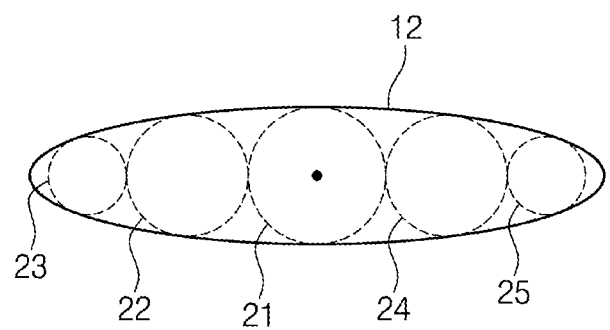
Figure 4:
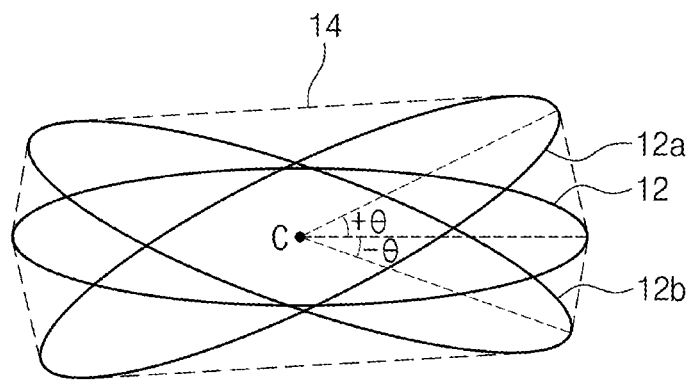

FIG. 1 is a view illustrating a system for predicting and avoiding collision and conflict between moving bodies according to one embodiment of the present invention, and FIGS. 2 to 4 are views illustrating a method for modeling moving bodies by a moving body modeling unit.

Although the moving body is represented in a two-dimensional shape in FIGS. 2 to 4 for the purpose of convenience of understanding, it can be easily understood that the moving body may have the same concept in a three-dimensional space.

First, referring to FIG. 1, a system 100 for predicting and avoiding collision and conflict between moving bodies includes a moving body information receiving unit 110, a moving body modeling unit 120, and a collision predicting unit 130.

The moving body information receiving unit 110 may receive information from each moving body. The received information may include the type, shape, size, weight, moving path, instantaneous position, moving direction and speed of the moving body. In the following description, the moving path, the instantaneous position, the moving direction and the speed of the moving body will be referred to as dynamic data of the moving body.

The moving body modeling unit 120 may receive information of the moving bodies from the moving body information receiving unit 110 to model the moving bodies into a predetermined shape. The moving body modeling unit 120 may model the moving body into a two-dimension or three-dimension moving body according to the type of the moving body. According to an embodiment, since the motion of the ship and the car can be expressed in a two-dimensional plane, the ship and the car may be modeled into a two-dimensional shape. In contrast, since the motion of the aircraft, drone, submarine, and satellite can be expressed in a three-dimensional space, they can be modeled into a three-dimensional shape. The ship and the car may also be modeled into the three-dimensional shape, but the data throughput can be reduced when they are modeled into the two-dimensional shape.

Referring to FIG. 2, the moving body modeling unit 120 may create two-dimensional or three-dimensional objects 11 by modeling the moving bodies 10 based on shape information of the moving bodies 10. The created objects 11 may have a geometric shape simplified compared to the actual shape of the moving bodies. According to an embodiment, the ship 10 may be modeled into an elliptical two-dimensional object 11.

The moving body modeling unit 120 may model the objects 11 into two-dimensional circles or three-dimensional spheres 12 based on size information of the created objects 11. According to an embodiment, the objects 11 of ships and cars may be modeled into two-dimensional circles 12, and the objects 11 of aircrafts, drones, submarines, and satellites may be modeled into three-dimensional spheres 12. The moving body modeling unit 120 may model a circumscribed circle having a smallest diameter circumscribing the objects 11 into a two-dimensional circle 12 or may model the circumscribed spheres 12 having the smallest diameter circumscribing the objects 11 into the three-dimensional spheres.

The moving body modeling unit 120 may model the two-dimensional circle or the three-dimensional sphere 12 into the moving disk or the moving sphere 13 by reflecting uncertainties in the instantaneous position and the moving speed of the moving bodies 10. Specifically, the moving body modeling unit 120 may model the moving body into the moving disk or the moving sphere 13 by using at least one of the moving speed of the moving bodies 10, the monitoring time window of the moving bodies 10, and size information of the two-dimensional circles or the three-dimensional spheres 12.

According to an embodiment, the moving body modeling unit 120 may model the two-dimensional circle 12 into the two-dimensional moving disk 13 by using Equation 1 below.

$$R = r + V_{max} \cdot t_p + \delta \qquad \text{[Equation 1]}$$

(where R is a radius of a moving disk 13, r is a radius of a two-dimensional circle 12, $V_{max}$ is a maximum velocity of a moving body 10, $t_p$ is a calculation time for predicting collision and conflict of the moving bodies 10, and δ is a safety factor)

According to another embodiment, the moving body modeling unit 120 may model the three-dimensional sphere 12 into the moving sphere 13 by using Equation 2 below.

$$R = r + V_{max} \cdot t_p + \delta \qquad \text{[Equation 2]}$$

(where R is a radius of moving spheres 13, r is a radius of a three-dimensional sphere 13, $V_{max}$ is a maximum velocity of a moving body 10, $t_p$ is a calculation time for predicting collision and conflict of moving bodies 10, and δ is a safety factor).

In the above description, $t_p$ needs to know the number of moving bodies subject to the prediction for collision and conflict, and $t_p$ can be determined when the number of moving bodies is determined. That is, the prediction time can be obtained when the number of moving bodies subject to the prediction is known. In contrast, a user may specify a proper value of $t_p$.

Referring to FIG. 3, the moving body modeling unit 120 may model the two-dimensional objects 12 into a plurality of inscribed circles 21 to 25 inscribed therein. Specifically, a boundary line of the objects 12 consists of a plurality of boundary region edges and boundary region vertices that abut the boundary region edges. The edges of the Voronoi diagram and the vertices of the Voronoi diagram that abut the edges of the Voronoi diagram may be created by applying the Voronoi diagram with respect to the boundary region edges and boundary region vertices. Then, among the vertices of the Voronoi diagram, a vertex having a largest radius of a circle that abuts the boundary lines of the objects is selected, and a first inscribed circle 21 having a largest radius is created based on the vertex. Next, second inscribed circles 22 and 24 having a largest radius except for the first inscribed circle 21 and not overlapping the first inscribed circle 21 are created. In this sequence, the two-dimensional objects 12 may be modeled into a plurality of inscribed circles 21 to 25.

The moving body modeling unit 120 may model the three-dimensional objects 12 into a plurality of inscribed spheres 21 to 25 inscribed therein. The moving body modeling unit 120 may model the inscribed spheres 21 to 25 through the boundary region data of the three-dimensional objects 12. Specifically, the first inscribed sphere 21 having the largest radius that abuts the boundary region of the objects, and the second inscribed spheres 22 and 23 having the next largest radius and not overlapping the first inscribed sphere 21 may be created by applying the Voronoi diagram to the boundary region data of the three-dimensional objects 12. In this manner, the three-dimensional objects 12 may be modeled into a plurality of inscribed spheres 21 to 25 inscribed therein.

Referring to FIG. 4, when the moving body modeling unit 120 knows the turning position and turning angle of the moving body on the linear moving path, which is approximated from the nonlinear moving path, the moving body modeling unit 120 may model the moving body into a geometric shape 14 that includes all cases 12, 12a, and 12b of the moving body obtained through the position change.

According to an embodiment, when the ship changes the direction and it is assumed that the direction can be changed only within a certain angle ±θ with respect to the existing traveling direction VI based on the center of gravity C, the moving body modeling unit 120 may model the object into the geometric shape 14 including the object 12 in the existing travelling direction, the object 12a turned to +θ, and the object 12b turned to −θ.

In addition, the moving body modeling unit 120 may model the moving bodies into a plurality of inscribed circles or inscribed spheres (not shown) that inscribe the geometric shape 14. Modeling of the plurality of inscribed circles or inscribed spheres that inscribe the geometric shapes 14 may proceed in the same manner as described in FIG. 3.

The collision predicting unit 130 may compute the Voronoi diagram between the moving disks or the moving spheres to predict the collision and the conflict between the moving disks or the moving spheres. The collision predicting unit 130 may predict the collision and conflict between moving disks or moving spheres in the monitoring time windows ($t_0$, $t_0+\Delta t$) of the moving bodies.

According to a first embodiment, the collision predicting unit 130 may compute the Voronoi diagram between the moving disks to calculate the edges of the Voronoi diagram. In addition, the collision predicting unit 130 may calculate a flipping event and a collision event. The flipping event is an event in which at least one of the edges of the Voronoi diagram is converted again to the edge after being converted to the vertex, and the collision event is an event in which the collision is predicted between a pair of moving disks defining the edge of the Voronoi diagram. The collision predicting unit 130 may create the collision event by using the dynamic data of the moving disks when it is predicted that a pair of moving disks that define the edge of the Voronoi diagram collide with each other.

There may be several occurrences of the flipping event and the collision event, and the collision predicting unit 130 may schedule the flipping event and the collision event in a chronological order of an occurrence time of the flipping event and the collision event.

The collision predicting unit 130 may calculate whether the actual collision occurs between the moving disks triggering the event in the chronological order of an occurrence time of the event. The collision predicting unit 130 may calculate whether the collision occurs by using the dynamic data of the moving disks. As a result of the calculation, it may be determined that the actual collision occurs or the collision does not occur. When it is determined that the actual collision is predicted, the collision predicting unit 130 may modify the dynamic data of the moving disks subject to the collision so as to avoid the collision between the moving disks.

The collision predicting unit 130 may update information of the Voronoi diagram after the corresponding event has been completed.

In more detail, the collision predicting unit 130 may update the following three pieces of information after the flipping event occurs.

A-1-1) the collision predicting unit 130 may update topology information with respect to the edge of the Voronoi diagram where the flipping event occurs and the edges of another Voronoi diagram connected thereto. The collision predicting unit 130 may redefine the Voronoi diagram with respect to the edge of the Voronoi diagram where the flipping event occurs and the edges of another Voronoi diagram connected thereto.

A-1-2) the collision predicting unit 130 may recalculate an occurrence time of the flipping event with respect to the edge of the Voronoi diagram where the flipping event occurs and the edges of another Voronoi diagram connected thereto.

A-1-3) the collision predicting unit 130 may recalculate an occurrence time of the collision event between a pair of moving disks defining the edge of the Voronoi diagram where the flipping event occurs.

In addition, the collision predicting unit 130 may update the following two pieces of information after the collision event occurs.

A-2-1) the collision predicting unit 130 may recalculate an occurrence time of the collision event between a pair of moving disks triggering the collision event and between other moving disks defining the edges of the Voronoi diagram in association with the pair of the moving disks.

A-2-2) the collision predicting unit 130 may recalculate an occurrence time of the flipping event with respect to the edge of the Voronoi diagram defined by a pair of moving disks triggering the collision event, the edges of the Voronoi defined by the pair of moving disks and other moving disks, and the edges of the Voronoi diagram defined by the other moving disks.

After updating above information of the Voronoi diagram, the collision predicting unit 130 may schedule the recalculated flipping event and the recalculated collision event in the chronological order of the occurrence time of the events, recalculate the actual collision between the moving disks triggering the event in the chronological order of the occurrence time of the events, and modify the dynamic data of the moving disks to avoid the collision when it is determined that the actual collision is predicted.

The collision predicting unit 130 may sequentially repeat the update of information of the Voronoi diagram where the collision event occurs, calculation of the actual collision between the moving disks having updated information, and the collision avoidance during the corresponding monitoring time window ($t_0$, $t_0+\Delta t$) and may terminate the calculation for the collision when it passes through the monitoring time window ($t_0$, $t_0+\Delta t$) or both of the flipping event and collision event do not occur during the monitoring time window ($t_0$, $t_0+\Delta t$).

According to a second embodiment, the collision predicting unit 130 may compute the face, the edge and the vertex of the Voronoi diagram by defining the Voronoi diagram between the moving spheres. In addition, the collision predicting unit 130 may calculate the edge flipping event, the face flipping event, and the collision event. The edge flipping event is an event in which the edge of the Voronoi diagram is converted into a triangle-shaped face after being converted into the vertex, and the face flipping event is an event in which the triangle-shaped face of the Voronoi diagram is converted into the edge after being converted into the vertex. The collision event is an event in which the collision is predicted between a pair of moving spheres that define all types of the faces of the Voronoi diagram as well as the triangle-shaped face. The collision predicting unit 130 may create the collision event by using dynamic data of moving spheres when it is expected that the pair of moving spheres collide with each other.

The edge flipping event, the face flipping event, and the collision event may be created several times, and the collision predicting unit 130 may schedule the events in the chronological order of the occurrence time.

The collision predicting unit 130 may calculate whether the actual collision occurs between the moving spheres triggering the event in the chronological order of the occurrence time of the events. As a result of the calculation, it may be determined that the actual collision occurs or the actual collision does not occur. When it is determined that the actual collision occurs, the collision predicting unit 130 may modify the dynamic data of the moving spheres subject to the collision so as to avoid the collision.

The collision predicting unit 130 may update information of the Voronoi diagram after completion of the corresponding event.

In detail, the collision predicting unit 130 may update the following four pieces of information after the edge flipping event occurs.

B-1-1) the collision predicting unit 130 may update topology information of the Voronoi diagram where the edge flipping event occurs. The collision predicting unit 130 may redefine the Voronoi diagram with respect to the moving spheres defining the face of the Voronoi diagram after the edge flipping event occurs and the edges of the Voronoi diagram that abut the vertices constituting the face.

B-1-2) the collision predicting unit 130 may recalculate the edge flipping event with respect to the edges of the Voronoi diagram that abut vertices constituting the triangle-shaped face of the Voronoi diagram after the edge flipping event occurs. Recalculate the occurrence of. However, when the edge of the Voronoi diagram is included in the other triangle-shaped face of the Voronoi diagram, it is excluded from the calculation.

B-1-3) the collision predicting unit 130 may recalculate an occurrence time of the face flipping event with respect to the triangle-shaped face of the Voronoi diagram, which is newly created due to the occurrence of the edge flipping event. In addition, if there is another triangle-shaped face of the Voronoi diagram that abuts a vertex of the triangle-shaped face of the Voronoi diagram, the occurrence time of the face flipping event may be recalculated with respect to the face.

B-1-4) the occurrence of the collision event between the moving spheres that define all faces of the Voronoi diagram newly created in B-1-2) may be recalculated. The recalculation of the occurrence of the collision event may be performed not only for the triangle-shaped face of the Voronoi diagram, but also for the other types of faces of the Voronoi diagram.

In addition, the collision predicting unit 130 may update the following four pieces of information after the face flipping event occurs.

B-2-1) the collision predicting unit 130 may update topology information of the Voronoi diagram where the face flipping event occurs. The collision predicting unit 130 may redefine the Voronoi diagram with respect to the moving spheres that define the edges of the Voronoi diagram that abut the edge of the Voronoi diagram after the face flipping event occurs.

B-2-2) the collision predicting unit 130 may recalculate the occurrence of the edge flipping event with respect to the edge of the Voronoi diagram where the face flipping event occurs and the edge of the Voronoi diagram connected thereto. However, if the edge of the Voronoi diagram is included in the face of another triangle-shaped face of the Voronoi diagram, it is excluded from the calculation.

B-2-3) the collision predicting unit 130 may recalculate the occurrence of the face flipping event with respect to the faces of the Voronoi diagram connected to the edge of the Voronoi diagram where the face flipping event occurs.

B-2-4) the collision predicting unit 130 may recalculate the occurrence of the collision event between the moving spheres defining the face of the Voronoi diagram created after the recalculation of the occurrence of the edge flipping event according to B-2-2).

Further, the collision predicting unit 130 may update the following two pieces of information after the collision event occurs.

B-3-1) the collision predicting unit 130 may recalculate the occurrence of the collision event with respect to a pair of moving spheres triggering the collision event and other moving spheres defining the faces of the Voronoi diagram in association with the pair of moving spheres.

B-3-2) the collision predicting unit 130 may recalculate the occurrence of the edge flipping event and the face flipping event with respect to the face of the Voronoi diagram that abuts the vertices of the Voronoi diagram included in the faces of the Voronoi diagram defined by the pair of moving spheres and the other moving spheres.

The collision predicting unit 130 may schedule the edge flipping event, the face flipping event, and the collision event, which are recalculated as described above, in the chronological order of the occurrence time of the events, calculate the actual collision between the moving spheres triggering the events in the chronological order of the occurrence time, and modify the dynamic data of the moving spheres subject to the collision to avoid the collision when the actual collision is predicted.

The collision predicting unit 130 may sequentially repeat the update of information of the Voronoi diagram, calculation of the actual collision between the moving spheres having updated information, and the collision avoidance process during the monitoring time window of the moving bodies and may terminate the collision prediction between the moving spheres when it passes through the monitoring time window of the moving bodies or all the edge flipping event, the face flipping event and the collision event do not occur during the monitoring time window.

Hereinafter, the method for predicting and avoiding collision and conflict between moving bodies using a system for predicting and avoiding collision and conflict between the multiple moving bodies will be described. The method for predicting and avoiding collision and conflict between multiple moving bodies will be described through the first embodiment in which the multiple moving bodies are modeled in the two-dimension for predicting the collision and the second embodiment in which the multiple moving bodies are modeled in the three-dimension for predicting the collision.

Figure 5:
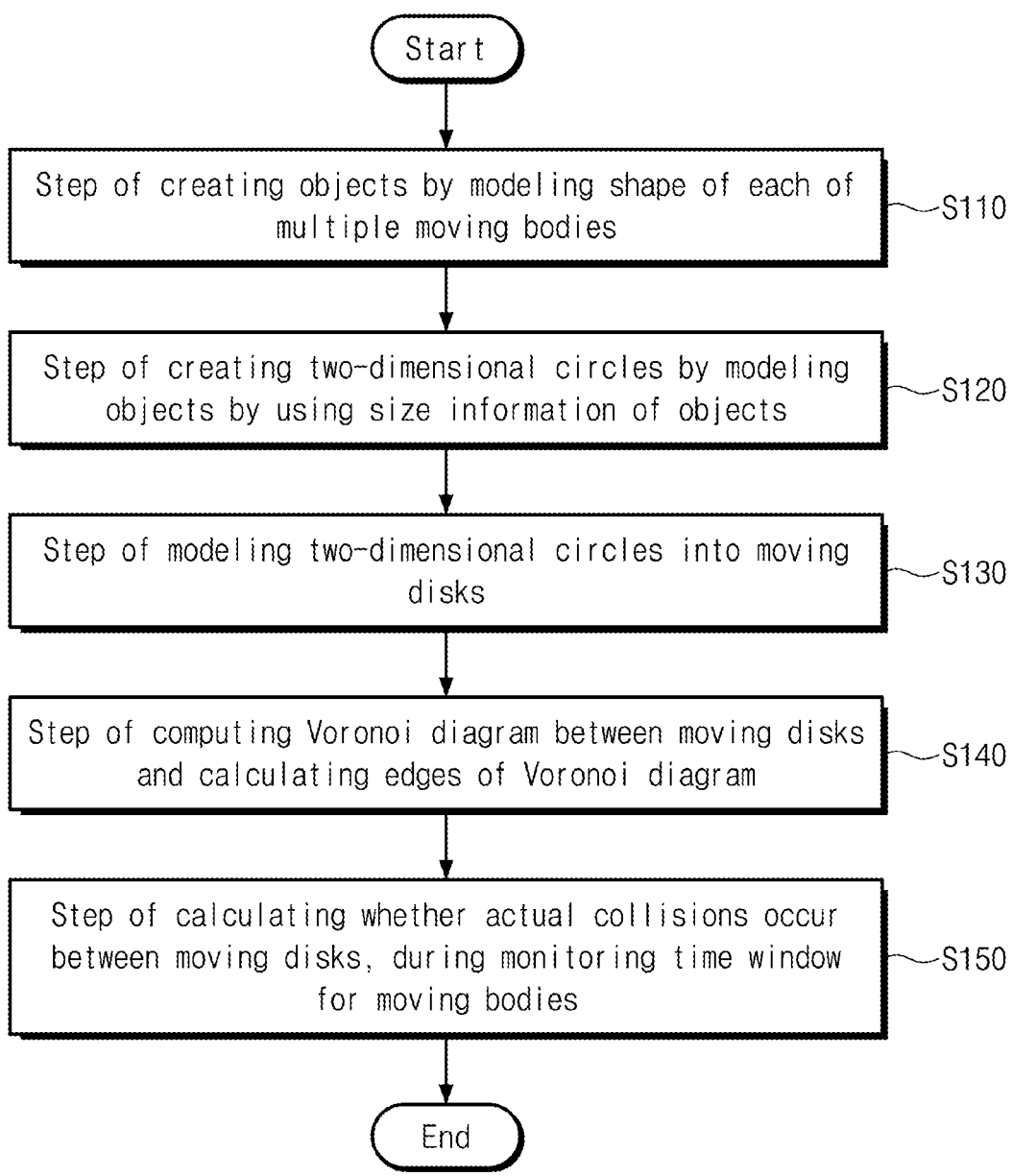
FIG. 5 is a flowchart illustrating a method for predicting and avoiding collision and conflict between moving bodies according to a first embodiment of the present invention.

FIG. 5 is a flowchart illustrating THE method for predicting and avoiding collision and conflict between the multiple moving bodies according to the first embodiment of the present invention.

Referring to FIG. 5, the method for predicting and avoiding collision and conflict between the multiple moving bodies includes: creating objects by modeling a shape of each of the multiple moving bodies (S110); creating two-dimensional circles by modeling the objects by using size information of the objects (S120); modeling the two-dimensional circles into moving disks by using at least one of moving speeds of the moving bodies, a monitoring time window for the moving bodies, and the size information of the two-dimensional circles (S130); computing a Voronoi diagram between the moving disks to calculate edges of the Voronoi diagram (S140); and calculating whether actual collision occurs between the moving disks during the monitoring time window for the moving bodies (S150).

Referring to FIGS. 2 and 5, in step S110 of modeling the shape of each of the multiple moving bodies 10 to create the objects 11, the objects 11 may be created based on shape information of the moving bodies 10.

In step S120 of creating the two-dimensional circle 12 by modeling the objects 11 based on the size information of the objects 11, two-dimensional circles 12 having the smallest diameter that circumscribe each of the objects 11 may be created.

In step S130 of modeling the two-dimensional circles 12 into the moving disks 13, the two-dimensional circles 12 may be modeled into the moving disks 13 by using at least one of the moving speed of the moving bodies 10, the monitoring time window of the moving bodies 10, and the size information of the two-dimensional circles 12. According to the embodiment, the two-dimensional circles 12 may be modeled into the moving disks 13 by using Equation 1 described above.

Figure 6:
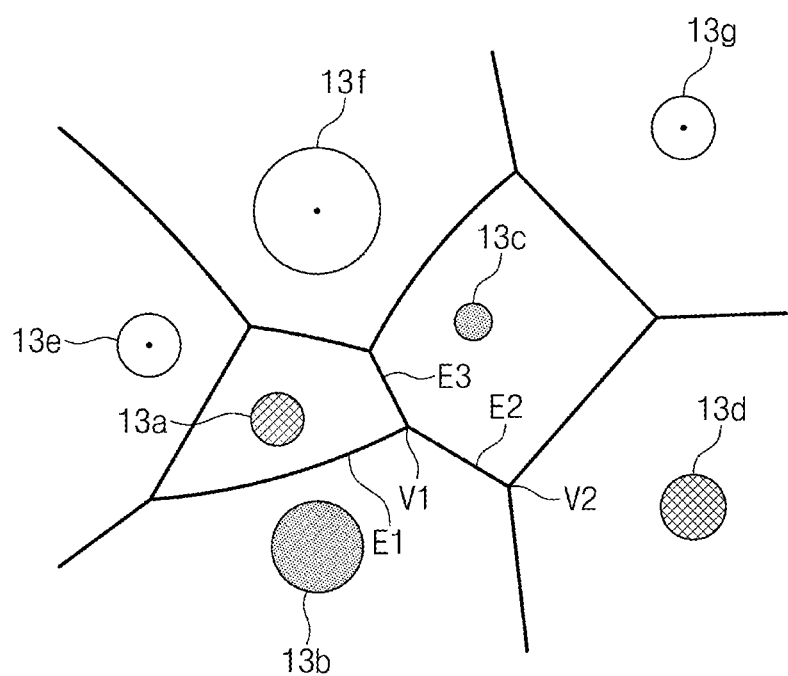
FIG. 6 is a view illustrating a step of calculating edges of a Voronoi diagram by computing a Voronoi diagram between moving disks.

FIG. 6 is a view illustrating a step of calculating the edges of the Voronoi diagram by computing the Voronoi diagram between the moving disks.

Referring to FIGS. 5 and 6, in step S140 of calculating the edges of the Voronoi diagram by computing the Voronoi diagram between the moving disks, the Voronoi diagram between a plurality of moving disks 13a to 13g may be computed and the edges E1, E2, E3, . . . and the vertices V1, V2, . . . of the Voronoi diagram may be calculated. The edges E1, E2, E3, . . . of the Voronoi diagram may be created between a pair of adjacent moving disks 13a to 13g, and the vertices V1, V2, . . . of the Voronoi diagram may be created as at least three edges E1, E2, E3, . . . of the Voronoi diagram meet each other.

In step S150 of calculating the actual collision between the moving disks 13a to 13g, the occurrence of the flipping event and the collision event may be calculated during the monitoring time window for the moving bodies and the events may be scheduled in the chronological order of the occurrence time of the events.

Figure 7:
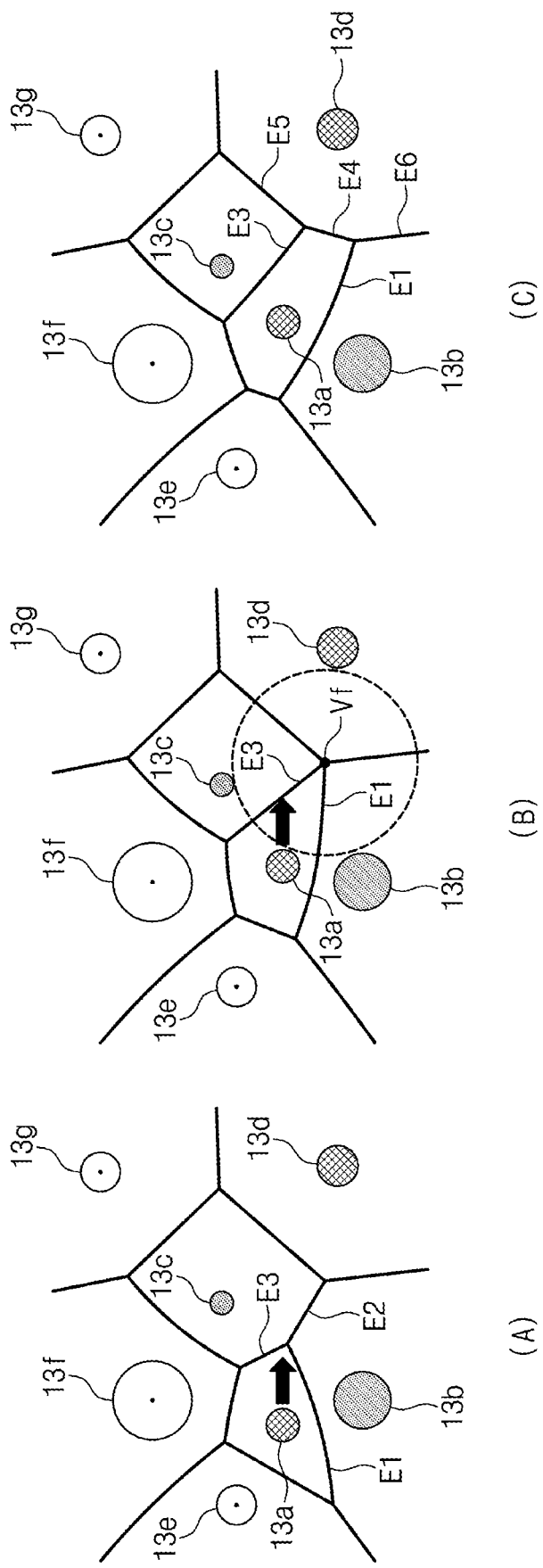
FIG. 7 is a view for explaining a flipping event according to one embodiment of the present invention.

FIG. 7 is a view illustrating the flipping event according to one embodiment of the present invention.

First, referring to (A) of FIG. 7, the edge E2 of the Voronoi diagram may be created by two moving disks 13b and 13c at a first time point to. Referring to (B), the edge E2 of the Voronoi diagram may be converted into the vertex $V_f$ at the second time point $(t_0 < t_1 < t_0 + \Delta t)$ in accordance with the movement of the moving disk 13a. Referring to (C), the vertex $V_f$ of the Voronoi diagram may be converted again into the edge E4 at the third time point $(t_1 < t_2 < t_0 + \Delta t)$ in accordance with the movement of the moving disk 13a. In this manner, as the moving disk 13a moves, the flipping event, in which the edge E2 of the Voronoi diagram is converted again into the edge E4 after being converted into the vertex $V_f$, may occur.

Figure 8:
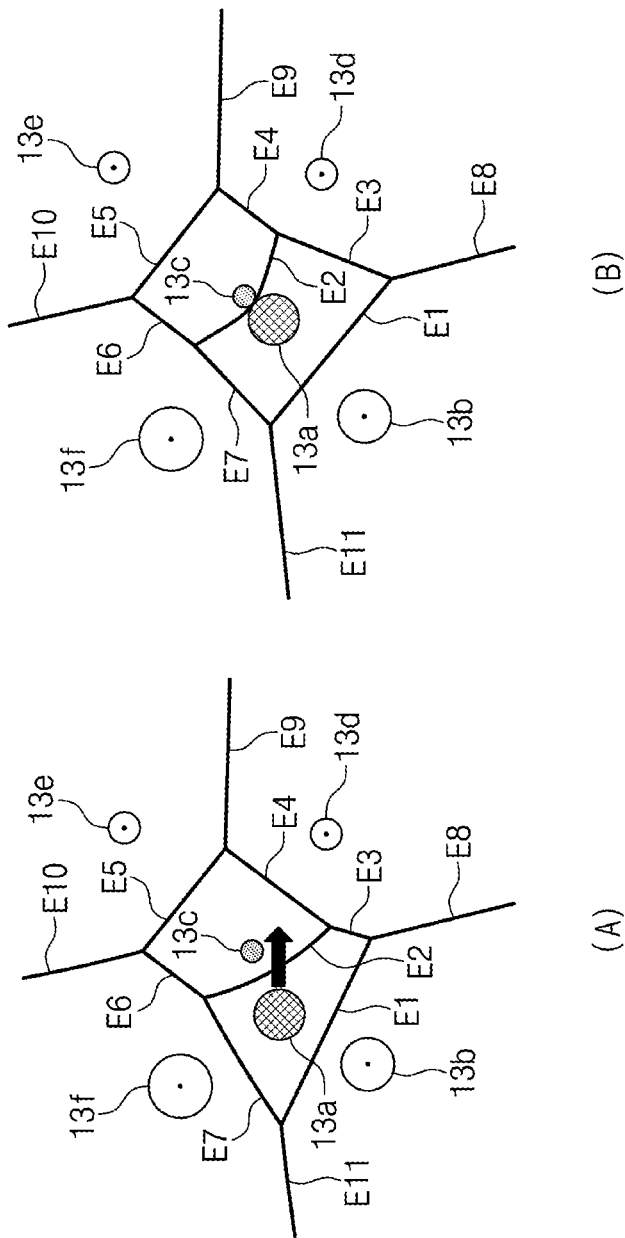
FIG. 8 is a view for explaining a collision event according to an embodiment of the present invention.

FIG. 8 is a view illustrating the collision event according to an embodiment of the present invention.

Referring to (A) of FIG. 8, the edge E2 of the Voronoi diagram may be created at the first time point $t_0$ by the pair of moving disks 13a and 13c. Referring to (B), the collision of two moving disks 13a and 13c may be predicted at the second time point $(t_0 < t_1 < t_0 + \Delta t)$ according to the dynamic data of the pair of moving disks 13a and 13c so that the collision event may occur.

Although one flipping event and one collision event are shown in the drawing, several flipping events and several collision events may occur simultaneously or in time series according to the number of moving disks and the dynamic data.

In the step of calculating the actual collision between the moving disks 13a and 13c, it may be calculated whether the collision occurs between the moving disks 13a and 13c triggering the corresponding events in the chronological order of the occurrence time of the events. The calculation of the collision may be performed by using the dynamic data of the moving disks 13a and 13c, and it may be determined that the actual collision occurs or the actual collision does not occur. If it is determined that the collision occurs, the dynamic data of the moving disks 13a and 13c subject to the collision may be modified to avoid the collision.

Figure 9:
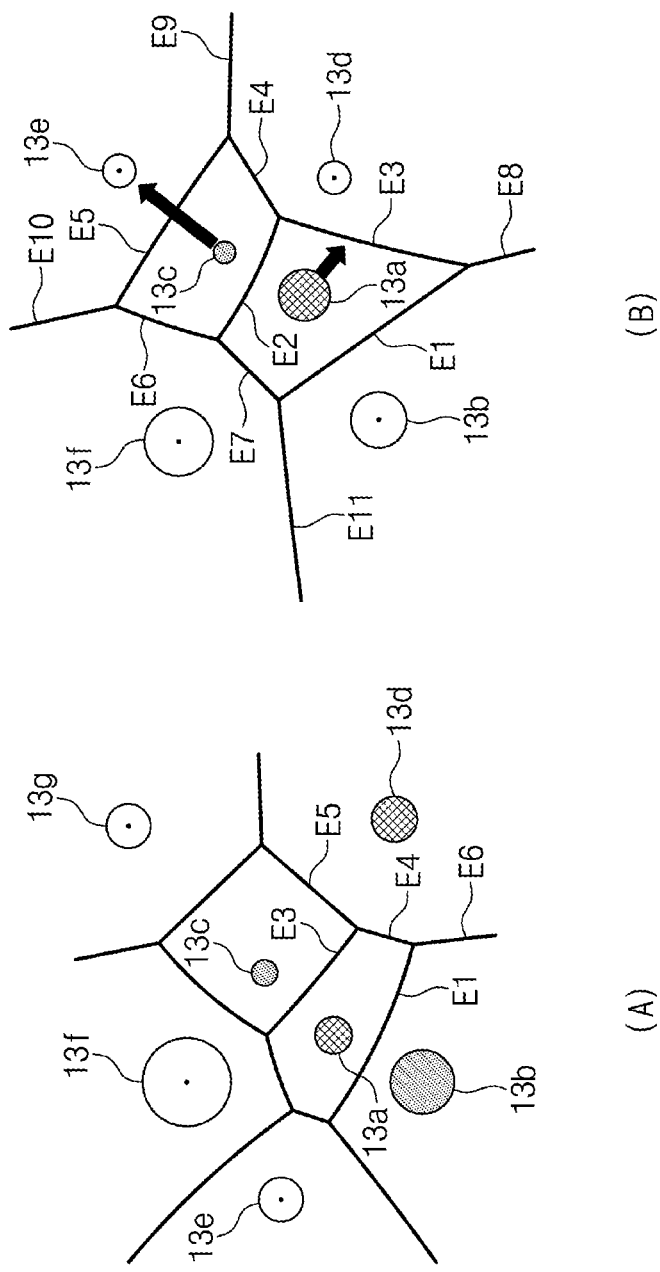
FIG. 9 is a view for explaining information of a Voronoi diagram that is updated after a flipping event and a collision event.

FIG. 9 is a view for explaining information of the Voronoi diagram that is updated after completion of the flipping event and the collision event.

Referring to (A) of FIG. 9, the information of the Voronoi diagram updated during the flipping event may be the same as the above-described A-1-1) to A-1-3).

Specifically, as the time for the flipping event elapses, topology information may be updated with respect to the edge E4 of the Voronoi diagram where the corresponding event occurs and the edges E1, E3, E5, and E6 of the other Voronoi diagram connected thereto.

In addition, the occurrence time of the flipping event may be recalculated with respect to the edge E4 of the Voronoi diagram and the edges E1, E3, E5, and E6 of the other Voronoi diagram connected thereto.

Further, the occurrence time of the collision event between the pair of moving disks 13a and 13d may be recalculated with respect to the edge E4 of the Voronoi diagram.

Referring to (B) of FIG. 9, the information of the Voronoi diagram updated during the collision event may be the same as the above-described A-2-1) and A-2-2). Specifically, as the time for the collision event elapses, the occurrence time of the collision event between the moving disks 13a to 13f may be recalculated with respect the edge E2 of the Voronoi diagram and the edges E1 and E3 to E7 of the Voronoi diagram, which are defined by the moving disks 13a and 13c defining the corresponding edge E2 of the Voronoi diagram in association with other disks 13b and 13d to 13f.

In addition, the occurrence time of the flipping event may be recalculated with respect to the edge E2 of the Voronoi diagram, the edges E1 and E3 to E7 of the Voronoi diagram, which are defined by the moving disks 13a and 13c defining the corresponding edge E2 of the Voronoi diagram in association with other disks 13b and 13d to 13f, and other edges E8, E9, E10, and E11 of the Voronoi diagram connected thereto.

In step S150 of calculating the actual collision between the moving disks, after updating the information of the Voronoi diagram described above, the recalculated flipping event and the recalculated collision event may be scheduled in the chronological order of the occurrence time, the occurrence of the actual collision between the moving disks triggering the events may be calculated in the chronological order of the occurrence time, and the dynamic data of the moving disks may be modified to avoid the collision when it is determined that the actual collision is predicted.

Further, in step S150 of calculating the actual collision between the moving disks, the update of information of the Voronoi diagram where the flipping event and the collision event occur, calculation of the actual collision between the moving disks having updated information, and the collision avoidance may be sequentially repeated during the corresponding monitoring time window $(t_0, t_0 + \Delta t)$ and the calculation for the collision may be terminated when it passes through the monitoring time window $(t_0, t_0 + \Delta t)$ or both of the flipping event and collision event do not occur during the monitoring time window $(t_0, t_0 + \Delta t)$.

Meanwhile, the method for predicting and avoiding collision and conflict between the multiple moving bodies may further include a step of determining whether the objects of the moving disks 13a to 13d subject to the collision collide with each other when it is calculated that the actual collision is predicted between the moving disks 13a to 13d triggering the above events. By determining whether the objects collide with each other, the possibility of the actual collision of the moving bodies may be verified.

In the step of determining the collision between the objects according to one embodiment, it may be calculated whether the objects actually collide with each other based on the moving direction and the moving speed of each of the moving disks during the monitoring time for the moving bodies.

Figure 10:
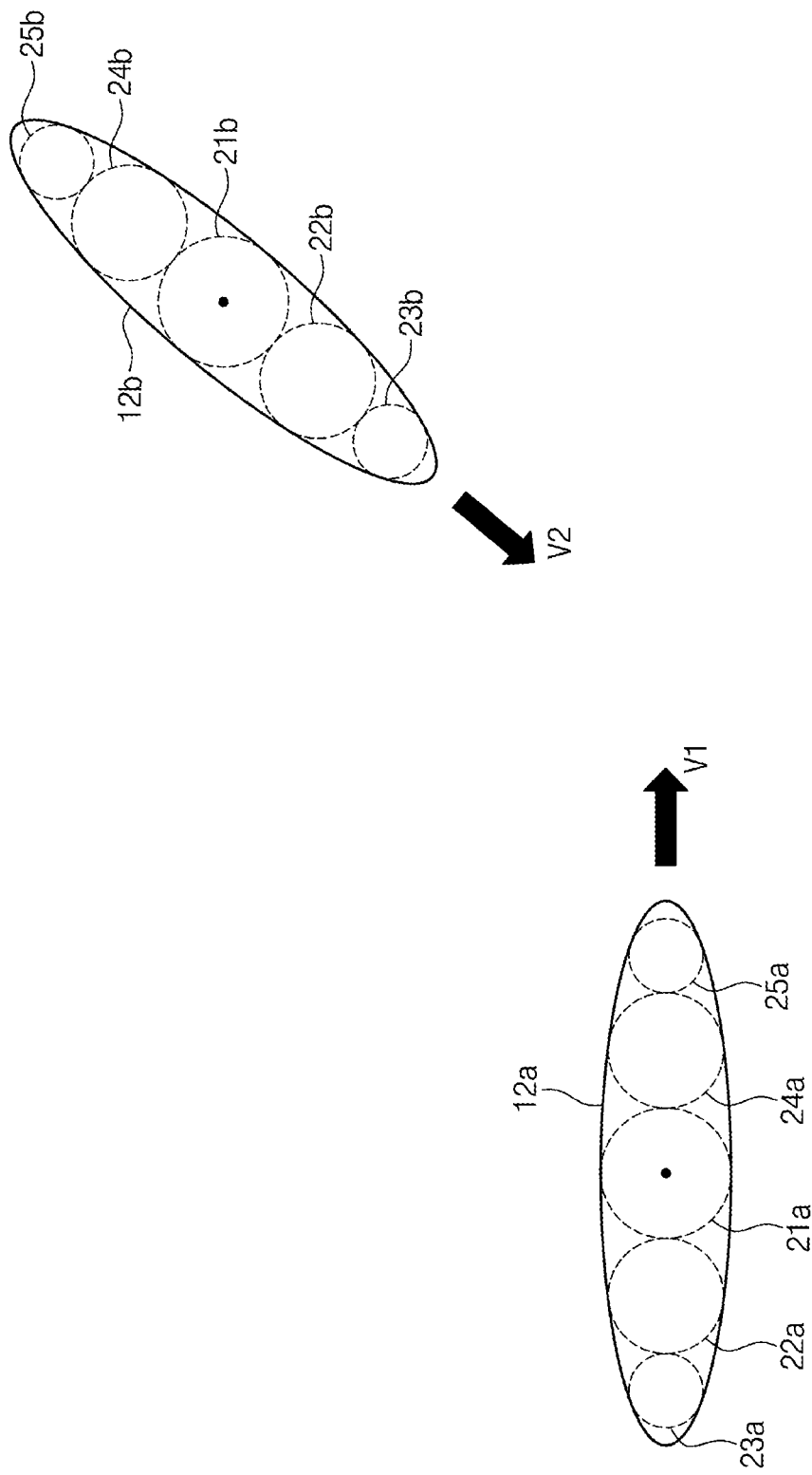
FIG. 10 is a diagram illustrating a step of determining whether collision occurs between objects.

FIG. 10 is a view illustrating the step of determining whether the collision occurs between the objects. Referring to FIG. 10, in the step of determining whether the objects collide with each, the objects 12a may be modeled into a plurality of inscribed circles 21a to 25a inscribed in each of the objects 12a by the method described with reference to FIG. 3 and the collision may be calculated in a unit of the inscribed circles 21a to 25a. In the step of determining whether the collision occurs in the unit of the inscribed circles 21a to 25a, the moving direction and the moving speed V1 of the moving body may be applied to each of the inscribed circles 21a to 25a to predict the moving path of the inscribed circles 21a to 25a, and the collision between the inscribed circles 21a to 25a and 21b to 25b of the two objects 12a and 12b may be estimated by predicting the moving path of the objects 12a and 12b and the inscribed circles 21b to 25b thereof based on moving information V2 of the other moving body. When any one of the inscribed circles 21a to 25a constituting one object 12a collides with the inscribed circles 21b to 25b constituting the other object 12b, it can be predicted that the collision may occur between the two objects 12a and 12b.

In the step of determining the collision between the objects according to another embodiment, when the turning position and the turning angle of the moving body on the linear moving path approximated from the nonlinear moving path are known, the object may be modeled into the geometric shape including all cases of the moving body obtained through the position change within the turning position and the turning angle as described above with reference to FIG. 4 and the collision of the geometric shapes may be calculated by applying the moving direction and the moving speed of the moving body to the geometric shapes.

In addition, the geometric shapes may be modeled into a plurality of inscribed circles inscribed in each of the geometric shapes, and the collision of the geometric shapes may be calculated in a unit of the inscribed circle.

Figure 11:
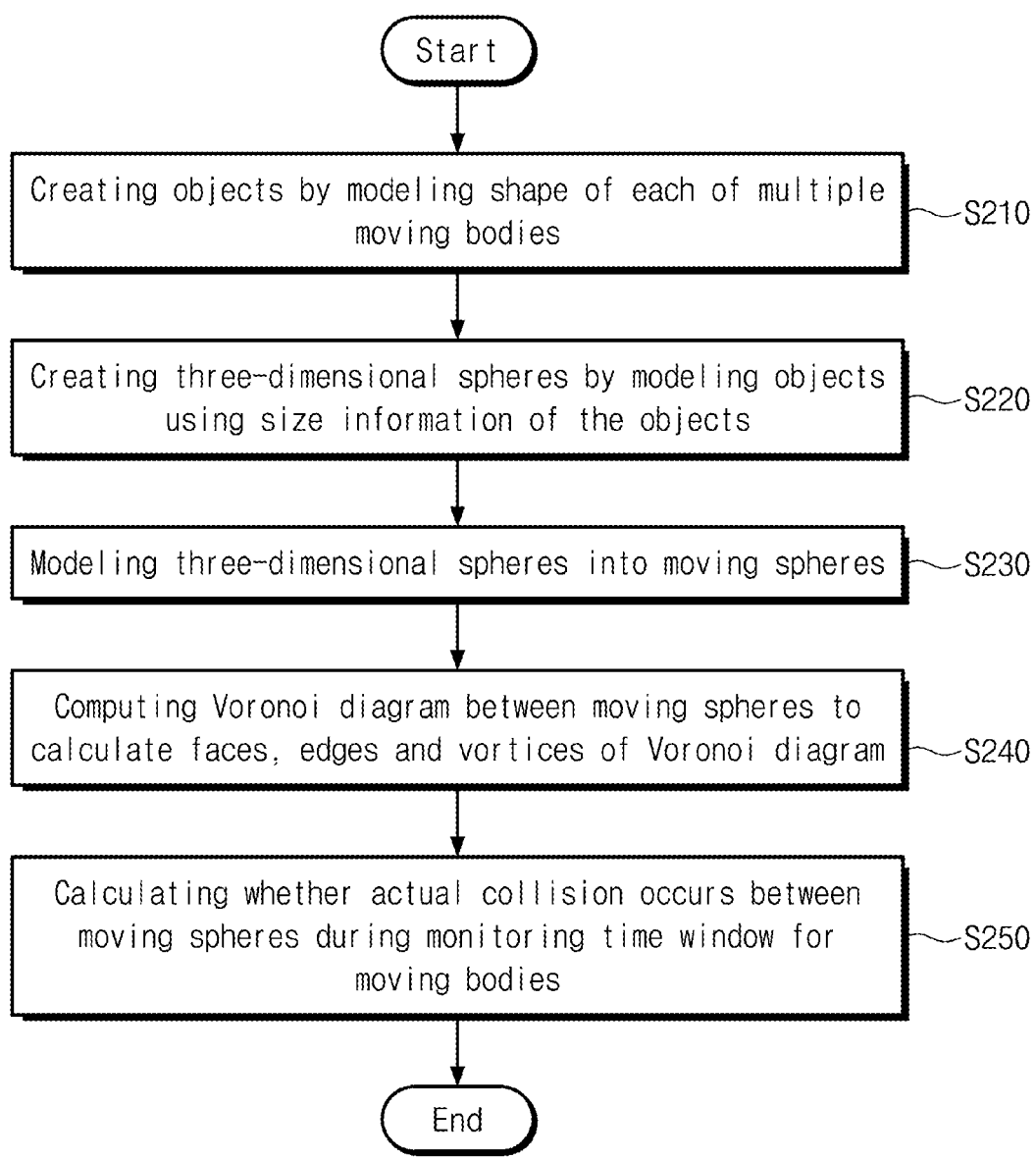
FIG. 11 is a flowchart illustrating a method for predicting collision and conflict between moving bodies according to a second embodiment of the present invention.

FIG. 11 is a flowchart illustrating a method for predicting and avoiding collision and conflict between multiple moving bodies according to a second embodiment of the present invention.

Referring to FIG. 11, the method for predicting and avoiding collision and conflict between the multiple moving bodies includes: creating objects by modeling a shape of each of the multiple moving bodies (S210); creating three-dimensional spheres by modeling the objects using size information of the objects (S220); modeling the three-dimensional spheres into moving spheres by using at least one of moving speeds of the moving bodies, a monitoring time window for the moving bodies, and the size information of the three-dimensional spheres (S230); computing a Voronoi diagram between the moving spheres to calculate faces, edges and vortices of the Voronoi diagram (S240); and calculating whether actual collision occurs between the moving spheres during the monitoring time window for the moving bodies (S250).

In step S210 of modeling the shape of each of the multiple moving bodies to create the objects, the objects may be created based on shape information of the moving bodies.

In step S220 of creating the three-dimensional spheres by modeling the objects based on the size information of the objects, three-dimensional spheres having the smallest diameter that circumscribe each of the objects may be created.

In step S230 of modeling the three-dimensional spheres into the moving spheres, the three-dimensional spheres may be modeled into the moving spheres by using at least one of the moving speed of the moving bodies, the monitoring time window of the moving bodies, and the size information of the three-dimensional spheres. According to the embodiment, the three-dimensional spheres may be modeled into the moving spheres by using Equation 2 described above.

Figure 12:
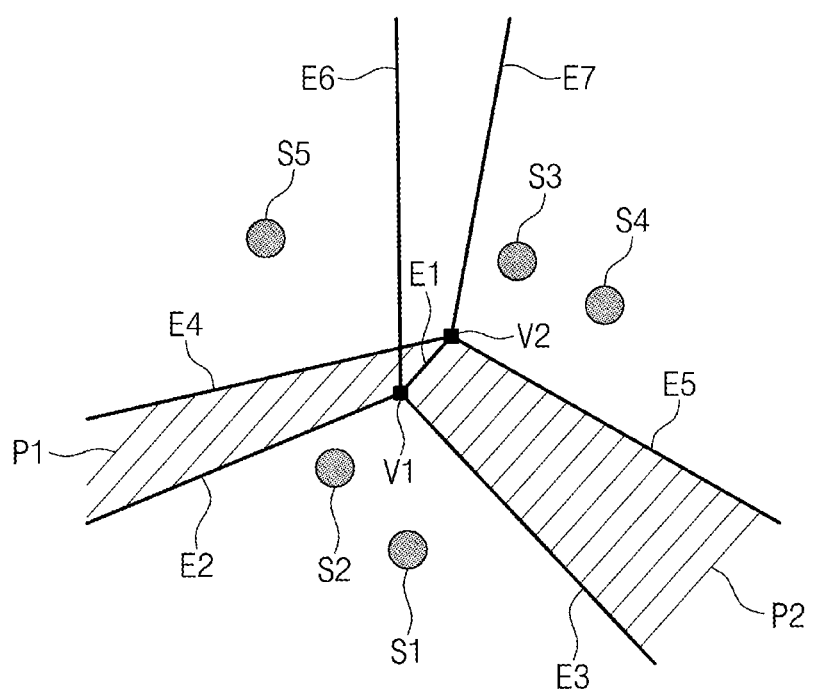
FIG. 12 is a view illustrating a step of calculating a face, an edge, and a vertex of a Voronoi diagram by computing a Voronoi diagram between moving spheres.

In step S240 of calculating the faces, the edges and the vertices of the Voronoi diagram by computing the Voronoi diagram between the moving spheres, as shown in FIG. 12, the Voronoi diagram between a plurality of moving spheres S1 to S5 may be computed and the faces P1, P2, . . . of the Voronoi diagram, the edges E1 to E7 of the Voronoi diagram and the vertices V1 and V2 of the Voronoi diagram may be calculated. The faces P1, P2, . . . of the Voronoi diagram may be created between two adjacent moving spheres S1 to S5, the edges E1 to E7 of the Voronoi diagram may be created as at least two faces P1, P2, . . . of the Voronoi diagram meet each other, and the vertices V1 and V2 of the Voronoi diagram may be created as at least three edges E1 to E7 of the Voronoi diagram meet each other.

In step S250 of calculating the actual collision between the moving spheres, the occurrence of the edge flipping event, the face flipping event, and the collision event may be calculated during the monitoring time window for the moving bodies and the events may be scheduled in the chronological order of the occurrence time of the events.

Figure 13:
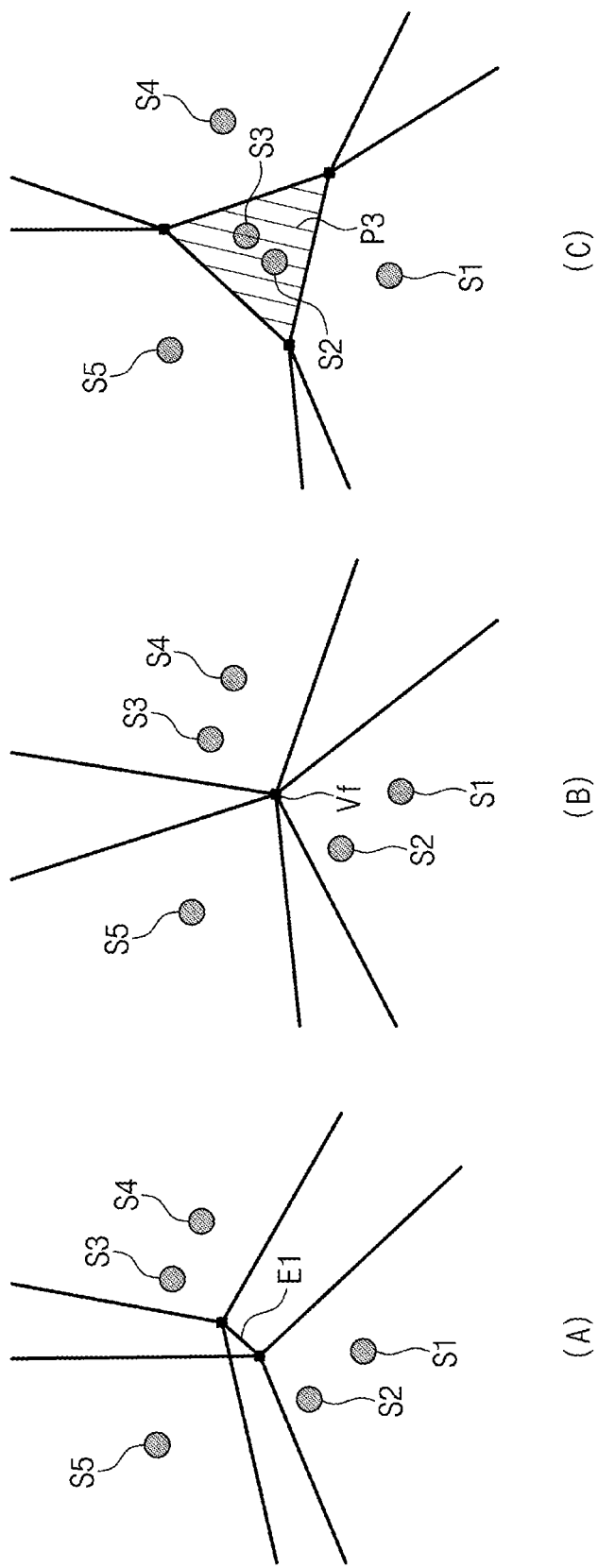
FIG. 13 is a view illustrating an edge flipping event and a face flipping event according to the present invention.

FIG. 13 is a view illustrating the edge flipping event and the face flipping event according to the present invention.

First, referring to (A) of FIG. 13, the edge E1 of the Voronoi diagram may be created by three faces of the Voronoi diagram at a first time point to. Referring to (B), the edge E1 of the Voronoi diagram may be converted into the vertex $V_f$ at the second time point $(t_0 < t_1 < t_0 + \Delta t)$ in accordance with the movement of the moving spheres S1 to S5. Referring to (C), the vertex $V_f$ of the Voronoi diagram may be converted again into the triangle-shaped face P3 at the third time point $(t_1 < t_2 < t_0 + \Delta t)$ in accordance with the movement of the moving spheres S1 to S5.

On the contrary, the moving spheres S1 to S5 may form the triangle-shaped face P3 of the Voronoi diagram ((C) of FIG. 13) at the first time point to, the face P3 of the Voronoi diagram may be converted into the vertex $V_f$ ((B) of FIG. 13) at the second time point $(t_0 < t_1 < t_0 + \Delta t)$ according to the movement of the moving spheres S1 to S5, and the edge E1 of the Voronoi diagram and the face of the Voronoi diagram including the same may be created at the third time point $(t_1 < t_2 < t_0 + \Delta t)$ according to the movement of the moving spheres S1 to S5 ((A) of FIG. 13).

As described above, the process of converting the edge E1 of the Voronoi diagram into the triangle-shaped face P3 through the vertex Vf may be referred to as an edge flipping event, and the process of converting the triangle-shaped face P3 of the Voronoi diagram into the edge E1 through the vertex Vf may be referred to as a face flipping event.

Although one flipping event is shown in the drawing, several flipping events may occur simultaneously or in time series according to the number of moving spheres S1 to S5 and the dynamic data.

In step S250 of calculating the actual collision between the moving spheres, the actual collision of the moving spheres S1 to S5 triggering the corresponding event may be calculated in the chronological order of the event time. The calculation of the collision may be performed by using the dynamic data of the moving spheres S1 to S5, and it may be determined that the actual collision occurs or the actual collision does not occur. If it is determined that the collision occurs, the dynamic data of the moving spheres subject to the collision may be modified to avoid collision of the moving spheres.

In the step of calculating the actual collision between the moving spheres, information of the Voronoi diagram may be updated after the elapse of the corresponding event time.

The update of information of the Voronoi diagram where the edge flipping event occurs may proceed in accordance with the contents of B-1-1) to B-1-4) described above, the update of information of the Voronoi diagram where the face flipping event occurs may proceed in accordance with the contents of the B-2-1) to B-2-4) described above, and the update of information of the Voronoi diagram where the collision event occurs may proceed in accordance with the contents of B-3-1) and B-3-2 described above.

In step S250 of calculating the actual collision between the moving spheres, the recalculated edge flipping event, the recalculated face flipping event and the recalculated collision event may be scheduled in the chronological order of the occurrence time, the occurrence of the actual collision between the moving spheres triggering the events may be calculated in the chronological order of the occurrence time, and the dynamic data of the moving spheres may be modified to avoid the collision when it is determined that the actual collision is predicted.

Further, in step S250 of calculating the actual collision between the moving spheres, the update of information of the Voronoi diagram, calculation of the actual collision between the moving spheres having updated information, and the collision avoidance may be sequentially repeated during the corresponding monitoring time window for the moving bodies and the calculation for the collision may be terminated when it passes through the monitoring time window or when the edge flipping event, the face flipping event and the collision event do not occur during the monitoring time window.

Meanwhile, the method for predicting and avoiding collision and conflict between multiple moving bodies may further include a step of determining whether the objects of the moving spheres subject to the collision collide with each other when it is calculated that the actual collision is predicted between the moving spheres triggering the above events. By determining whether the objects collide with each other, the possibility of the actual collision of the moving bodies may be verified.

In the step of determining the collision between the objects according to one embodiment, it may be calculated whether the objects actually collide with each other based on the moving direction and the moving speed of each of the moving spheres during the monitoring time for the moving bodies.

In the step of determining whether the objects collide with each according to another embodiment, the objects may be modeled into a plurality of inscribed spheres inscribed in each of the objects and the collision may be calculated in a unit of the inscribed spheres. The step for modeling the objects into the inscribed spheres may be performed in accordance with the process described with reference to FIG. 3. In the step of determining whether the collision occurs in the unit of the inscribed spheres, the moving direction and the moving speed of the moving body may be applied to each of the inscribed spheres to predict the moving path of the inscribed spheres, and the collision with the inscribed spheres of other objects in the predicted moving path may be determined. When any one of the inscribed spheres constituting one object collides with the inscribed spheres constituting the other object, it may be estimated that the collision occurs between both objects.

In step (S260) of determining the collision between the objects according to another embodiment, when the turning position and the turning angle of the moving body on the linear moving path approximated from the nonlinear moving path are known, the object may be modeled into the geometric shape including all cases of the moving body obtained through the position change within the turning position and the turning angle as described above with reference to FIG. 4 and the collision of the geometric shapes may be calculated by applying the moving direction and the moving speed of the moving body to the geometric shapes.

In addition, the geometric shapes may be modeled into a plurality of inscribed spheres inscribed in each of the geometric shapes, and the collision of the geometric shapes may be calculated in a unit of the inscribed circle.

In order to avoid the collision when it is predicted that two of the multiple moving bodies conflict/collide with each other after t time, the equation of the moving path of one or all of the two moving bodies may be modified to avoid the collision. The equation of the moving path may include the moving path and the magnitude of the speed according to the time within the moving path. Therefore, the method for modifying the equation of the moving path may be a method for changing only one of the moving path and the moving speed or both the moving path and the moving speed. In this case, the moving path and the moving speed may be nonlinear. Under the circumstance that many moving bodies are moving and the equation of the moving path of any moving body can be modified at any time, the optimal way to find the safest avoidance path is to select the most favorable solution after making various candidate solutions and evaluating each of the candidate solutions quickly. It is important to minimize the energy (fuel, battery, etc.) used for the avoidance path of the moving body subject to the present invention. For example, in the case of satellites, the energy used for the avoidance path is very expensive and directly linked to the life of the satellites in many cases, so the careful selection is essential. Therefore, the concept of optimal design for the avoidance path is needed. In this case, it is essential to define the time window in order to define the optimal state. In the case that a dynamic Voronoi diagram that covers the desired time window has been calculated, the satellite S of interest will be subject to the collision after a while, and it is necessary to make a decision for the avoidance path, according to the present invention, one S1, which is a copy of the moving body S serving as a main subject for the avoidance path, is placed in the same position as the moving body in the dynamic Voronoi diagram already calculated. In this case, the S1 is in a state where there is a difference in angle or speed, or in both the angle and the speed compared to the moving body S. In this state, as time passes along the time window, the S1 analyzes the neighbor relationship with respect to other objects at each moment by using the dynamic Voronoi diagram. Thus, one avoidance path solution may be evaluated in an average O(K) time, in which K is a number of events that exist throughout the time window of the dynamic Voronoi diagram. It is possible to create another avoidance path S2 different from the S1. In this case, a solution can be obtained by using the S1 and S2 independently in a given dynamic Voronoi diagram. That is, the algorithm for finding the optimal solution of the avoidance path may be parallel-processed based on the dynamic Voronoi diagram, and each avoidance path can be evaluated in O(K) time, so the optimal solution can be found very quickly. All candidate avoidance paths may be evaluated to find the best solution. In addition, the AI function may be additionally used as a method for finding the best solution among various candidate solutions.

Figure 14:
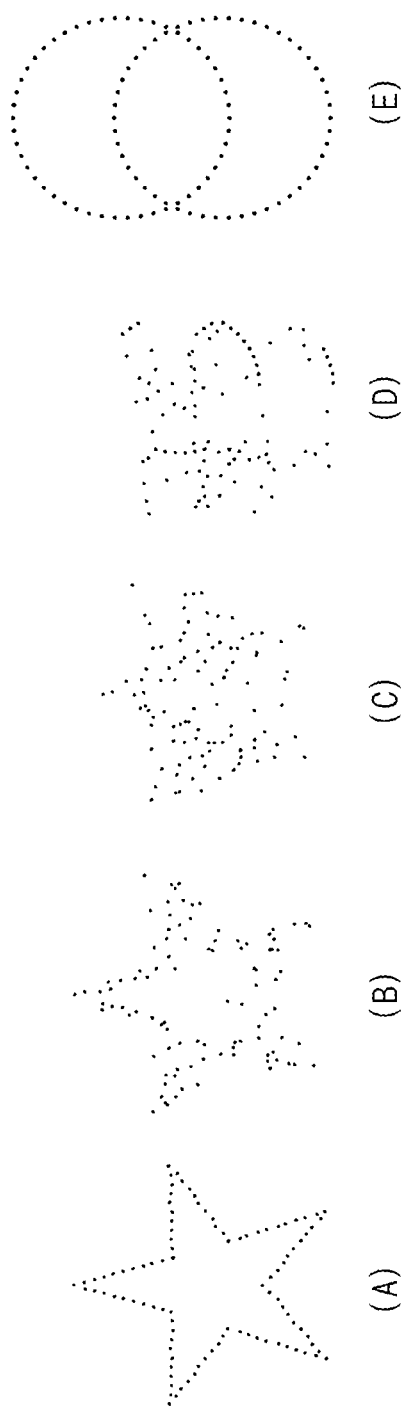
FIG. 14 is a view illustrating a method for predicting collision and conflict of a drone and providing an avoidance path according to one embodiment of the present invention.

FIG. 14 is a view illustrating a method for predicting collision and conflict of a drone and providing an avoidance path according to one embodiment of the present invention. Referring to FIG. 14, (A) to (E) show that drones predict the collision through the method for predicting collision and conflict of the moving bodies according to the present invention and set the avoidance path so that the drones sequentially move through a three-dimensional space without collision while changing the formation from a two-dimensional star to two circles. In the present embodiment, 100 drones were used, and each of the moving spheres was obtained by modeling the drones being moved. When it is necessary to move the drones from a position A of the moving spheres at a specific time point t1 to a position E of the moving spheres at a time point t2 after a predetermined time from the specific time point t1, the starting point and end point of the specific drone are predetermined and the drone moves linearly between the two points. Thus, the collision prediction may be possible by calculating the dynamic Voronoi diagram between the moving spheres during the time window (t1, t2), and when the above situation occurs, one of the two spheres is stopped (or moves slowly) and the other one moves quickly to avoid the collision. If necessary, spatial information of the Voronoi diagram may be used more actively to reflect more complex situations such as changing the avoidance path of the drone from the linear path to the nonlinear path as described above.

Figure 15:
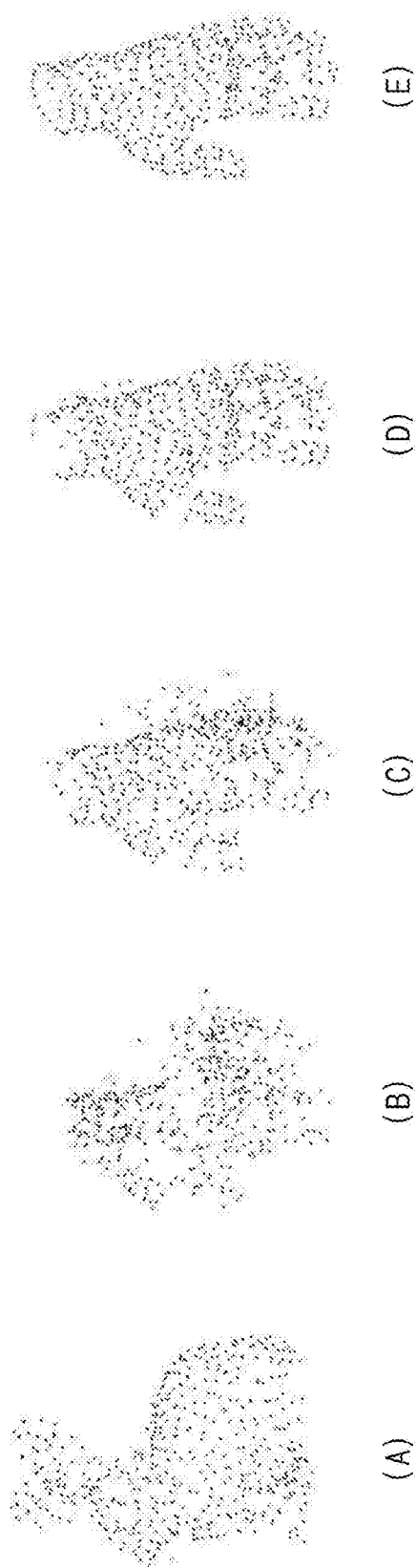
FIG. 15 is a view for explaining a method for predicting a collision and conflict of a drone and providing an avoiding path according to another embodiment of the present invention.

FIG. 15 is a view for explaining a method for predicting the collision of the drone and providing the avoiding path according to another embodiment of the present invention.

Referring to FIG. 15, (A) to (E) sequentially show that drones predict the collision through the method for predicting collision of the moving bodies according to the present invention and set the avoidance path so that the drones move through a three-dimensional space without collision. In the present embodiment, 500 drones were used, and each of the moving spheres was obtained by modeling the drones being moved. It is seen that the formation of the moving spheres is changed from a rabbit-shaped cluster to a hand-shaped cluster. When it is necessary to move the drones from a position A of the moving spheres at a specific time point t1 to a position E of the moving spheres at a time point t2 after a predetermined time from the specific time point t1, the starting point and end point of the specific drone are predetermined and the drone moves linearly between the two points. Thus, the collision prediction may be possible by calculating the dynamic Voronoi diagram between the moving spheres during the time window (t1, t2), and when the above situation occurs, one of the two spheres is stopped (or moves slowly) and the other one moves quickly to avoid the collision. If necessary, spatial information of the Voronoi diagram may be used more actively to reflect more complex situations such as changing the avoidance path of the drone from the linear path to the nonlinear path as described above.

Hereinafter, a method for predicting collision of moving bodies having known moving paths according to an embodiment of the present invention will be described. In the present invention, a satellite that moves around the earth will be used as an example of the moving body having the known moving path, but the moving body having the known moving path is not limited thereto and various objects that move along a predetermined trajectory may be used for the collision prediction. In the present invention, a three-dimensional moving sphere is described as an example, but the technical idea of the present invention can be equally applied to a two-dimensional moving disk. In addition, although the moving sphere is represented in the two dimension for the sake of convenience of understanding, it will be easily understood that the moving sphere can be applied in the three dimension.

Figure 16:
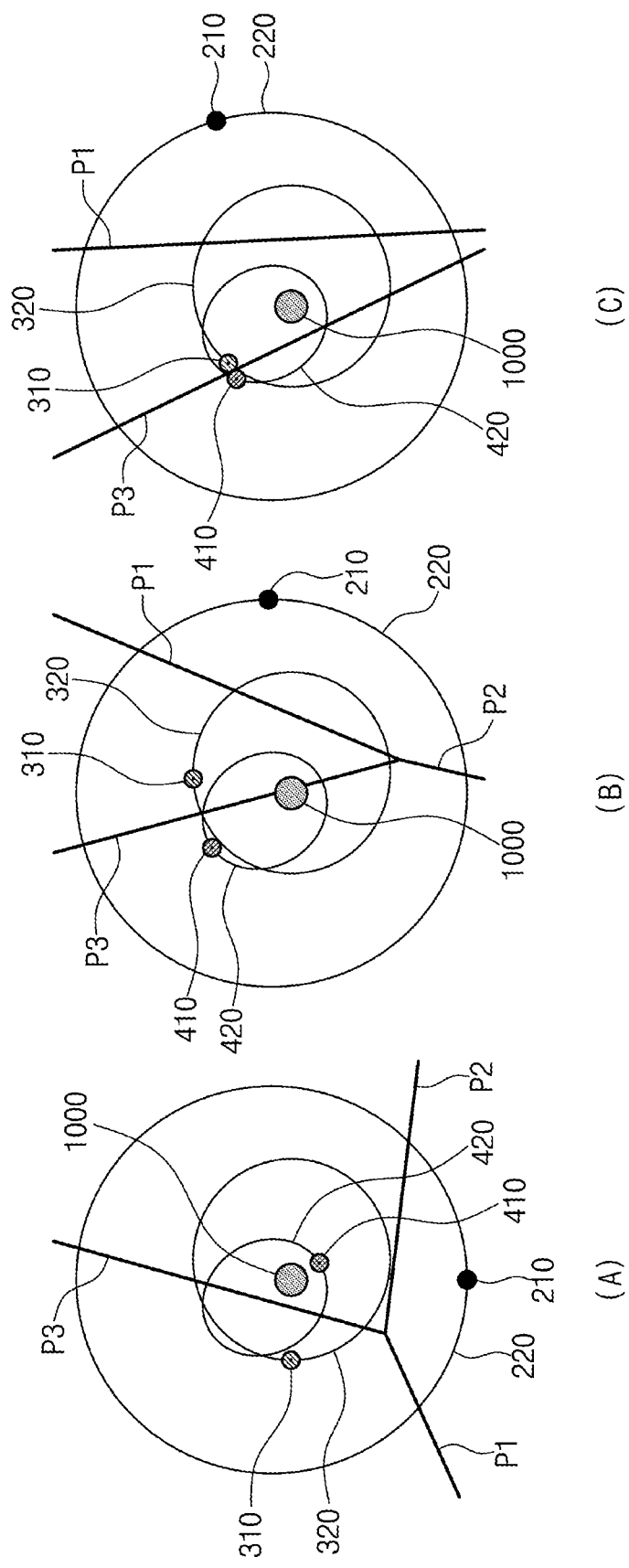
FIG. 16 is a view for explaining a method for predicting collision and conflict between moving bodies having known moving paths according to one embodiment of the present invention.
Figure 17:
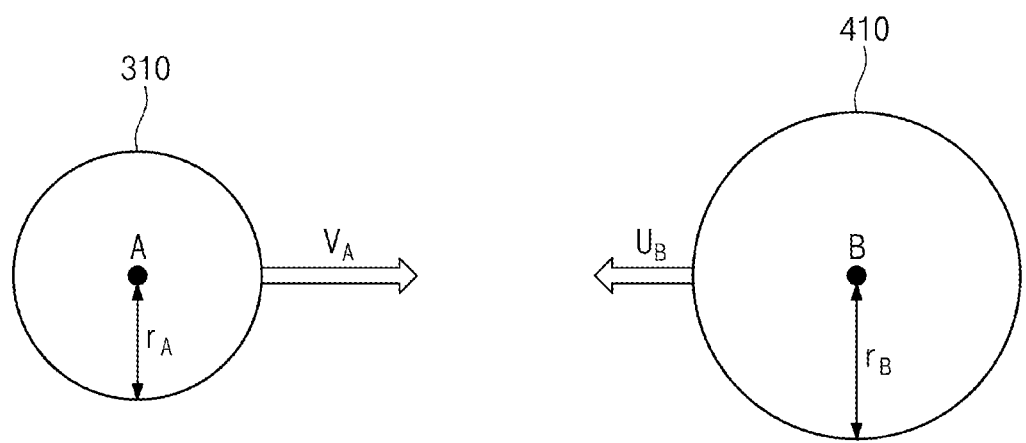
FIG. 17 is a view for explaining a method for determining whether moving bodies collide with each other.

FIG. 16 is a view for explaining a method for predicting the collision between moving bodies having known moving paths according to one embodiment of the present invention, and FIG. 17 is a view for explaining a method for determining whether moving bodies collide with each other.

First, referring to FIG. 16, the satellites may be modeled into moving spheres by the moving body modeling unit 120 described with reference to FIG. 1. First to third moving spheres 210, 310 and 410 may move around the earth 1000 along the respective trajectories 220, 320 and 420.

Here, (A) shows the positions of the first to third moving spheres 210, 310 and 410 at the first reference time point, (B) shows the positions of the first to third moving spheres 210, 310 and 410 at the second reference time point elapsed by a predetermined time from the first reference time point, and (C) shows the positions of the first to third moving spheres 210, 310 and 410 at the third reference time point elapsed by a predetermined time from the second reference time point.

Referring to (A), faces P1, P2 and P3 of the Voronoi diagram may be calculated by computing the Voronoi diagram for the first to third moving spheres 210, 310 and 410 at the first reference time point.

Among the first to third moving spheres 210, 310 and 410, the second and third moving spheres 310 and 410 nearest to the face P3 of the Voronoi diagram may be extracted as collision prediction objects.

The collision may be determined by analyzing the moving speeds of the second and third moving spheres 310 and 410 extracted as the collision prediction objects.

Referring to FIG. 17, the second and third moving spheres 310 and 410 in which the collision is expected may be set under the following conditions. A radius of the second moving sphere 310 is $r_A$, and a radius of the third moving sphere 410 is $r_B$. The position of the center point A of the second moving sphere 310 at the first reference time point is $(A_x, A_y, A_z)$, and the position of the center point B of the third moving sphere 410 at the first reference time point is $(B_x, B_y, B_z)$. The speed of the second moving sphere 310 moving along the trajectory is $V_A=(v_x, v_y, v_z)$, and the speed of the third moving sphere 410 moving along the trajectory is $U_B=(u_x, u_y, u_z)$ In the above-described conditions, the estimated position of the center point A of the second moving sphere 310 is A(t) after t time elapses from the first reference time point, the estimated position of the center point B of the third moving sphere 410 is defined as B(t), and the collision between the second moving sphere 310 and the third moving sphere 410 may be calculated through Equation 3 below.

$$d(t) = |A(t) - B(t)| = \sqrt{(w_x^2 + w_y^2 + w_z^2)t^2 + 2(w_x r_x + w_y r_y + w_z r_z)t + (r_x^2 + r_y^2 + r_z^2)}$$ [Equation 3]

($r_x$ is $A_x$-$B_x$, $r_y$ is $A_y$-$B_y$, $r_z$ is $A_z$-$B_z$, $w_x$ is $v_x$-$u_x$, $w_y$ is $v_y$-$u_y$, and $w_z$ is $v_z$-$u_z$)

Here, d(t) is the distance between the second moving sphere 310 and the third moving sphere 410 after t time elapses from the first reference time point. When d(t) converges to the sum of the radius $r_A$ of the second moving sphere 310 and the radius $r_B$ of the third moving sphere 410, it is determined that the second moving sphere 310 may collide with the third moving sphere 410.

The collision time point between the second moving sphere 310 and the third moving sphere 410 may be calculated through Equation 4 below.

$$(w_x^2+w_y^2+w_z^2)t^2+(w_x r_x+w_y r_y+w_z r_z)t+(r_x^2+r_y^2+r_z^2)-(r_A+r_B)^2=0$$ [Equation 4]

According to an embodiment, it is determined that the second and third moving spheres 310 and 410 may not collide with each other.

Referring back to (B) of FIG. 16, the faces P1, P2, and P of the Voronoi diagram may be calculated by computing the Voronoi diagram for the first to third moving spheres 210, 310 and 410 at the second reference time point.

Among the first to third moving spheres 210, 310 and 410, the second and third moving spheres 310 and 410 which are nearest to the faces P1, P2, and P3 of the Voronoi diagram may be extracted as collision prediction objects.

It is determined whether the collision occurs according to the method described with reference to FIG. 17 by analyzing the moving speeds of the second and third moving spheres 310 and 410 extracted as the collision prediction objects. According to an embodiment, it is determined that the second and third moving spheres 310 and 410 may not collide with each other.

Referring to (C), the positions of the first to third moving spheres 210, 310 and 410 may be confirmed at the third reference time point. It can be seen that the second and third moving spheres 310 and 410 may collide with each other at the third reference time point.

Figure 18:
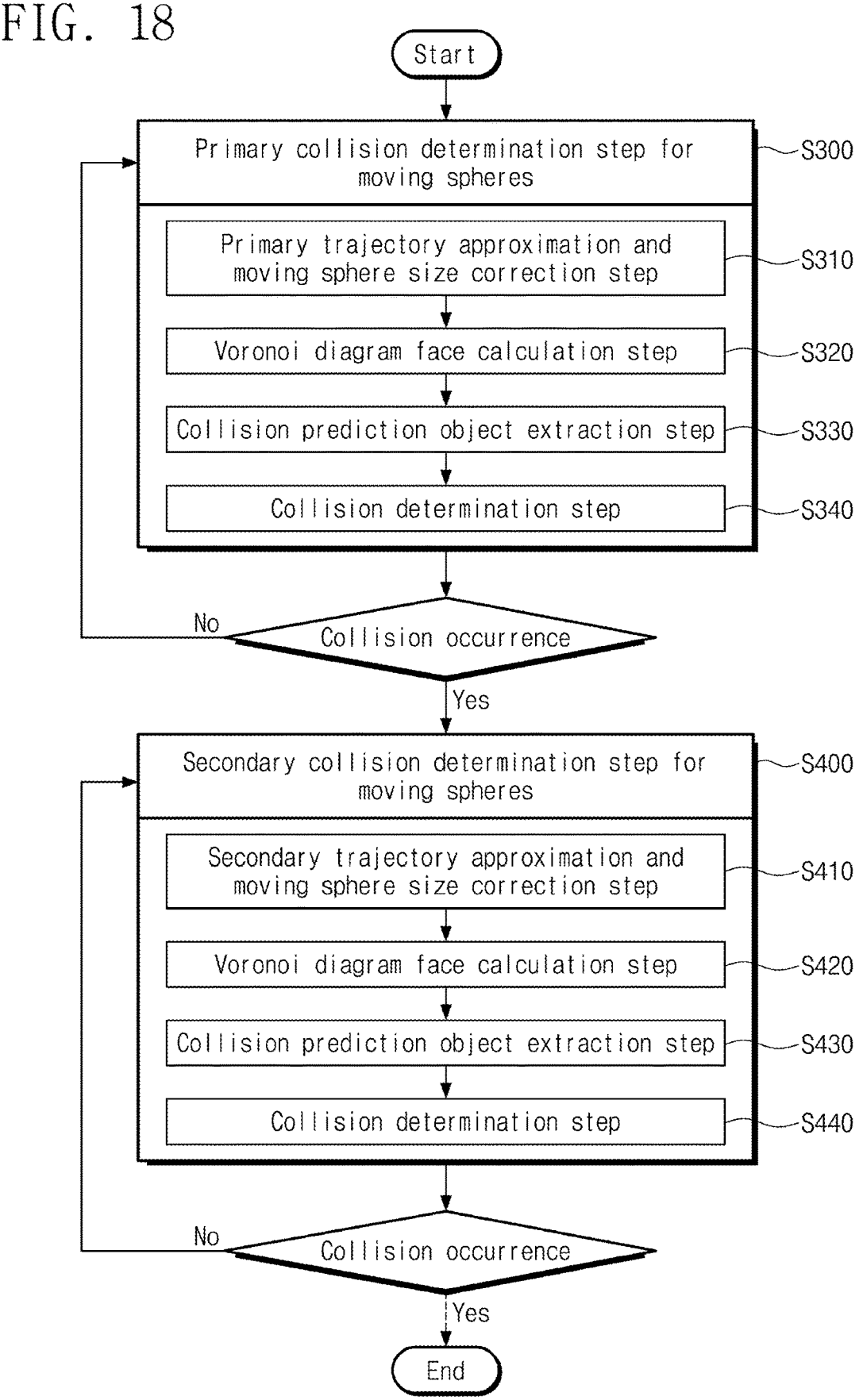
FIG. 18 is a flowchart illustrating a method for predicting collision of moving bodies having known moving paths according to another embodiment of the present invention.

FIG. 18 is a flowchart illustrating a method for predicting collision of moving bodies having known moving paths according to another embodiment of the present invention. In the present embodiment, a method for predicting collision of satellites as shown in FIG. 15 will be described as an example.

Referring to FIG. 18, a method for predicting collision of moving bodies having known moving paths may include a primary collision determination step S300 of predicting the collision between the moving spheres and a secondary collision determination step S400 of determining the collision of the moving spheres.

The primary collision determination step (S300) for the moving spheres may include a primary trajectory approximation and moving sphere size correction step (S310), a Voronoi diagram face calculation step (S320), a collision prediction object extraction step (S330), and a collision determination step (S340).

In the primary trajectory approximation and moving sphere size correction step (S310), the trajectories of the moving spheres are approximated to n linear sections to create first approximate trajectories. In addition, the size of the moving spheres is primarily corrected by reflecting an error between the trajectories of the moving spheres and the first approximate trajectories.

In order to determine whether the collision occurs between the moving spheres having the primarily corrected sizes, the Voronoi diagram face calculation step (S320), the collision prediction object extraction step (S330), and the collision determination step (S340) may be performed with respect to the moving spheres having the primarily corrected size. The Voronoi diagram face calculation step (S320), the collision prediction object extraction step (S330), and the collision determination step (S340) may be performed in the same manner as described with reference to FIG. 11.

When it is determined in the primary collision determination step (S300) for the moving spheres that the collision does not occur between the moving spheres having the primarily corrected size, the primary collision determination step (S300) for the moving spheres may be repeated at a predetermined time period.

When it is determined in the primary collision determination step (S300) for the moving spheres that the collision occurs between the moving spheres having the primarily corrected size, the secondary collision determination step (S400) for the moving spheres may be performed. The second collision determination step (S400) for the moving spheres may include a secondary trajectory approximation and moving sphere size correction step (S410), a Voronoi diagram face calculation step (S420), a collision prediction object extraction step (S430), and a collision determination step (S440).

In the secondary trajectory approximation and moving sphere size correction step (S410), the trajectories of the moving spheres may be approximated to m linear sections more than n linear sections to create second approximate trajectories. In addition, the size of the moving spheres may be secondarily corrected by reflecting an error between the trajectories of the moving spheres and the second approximate trajectories. The size of the moving spheres having the secondarily corrected size is smaller than the size of the moving spheres having the primarily corrected size.

In order to determine whether the collision occurs between the moving spheres having the secondarily corrected size, the Voronoi diagram face calculation step (S420), the collision prediction object extraction step (S430), and the collision determination step (S440) may be performed with respect to the moving spheres having the secondarily corrected size.

When it is determined in the secondary collision determination step (S400) that the collision does not occur between the moving spheres having the secondarily corrected size, the secondary collision determination step (S400) for the moving spheres may be repeatedly performed at predetermined periods.

When it is determined in the secondary collision determination step (S400) that the collision occurs between the moving spheres having the secondarily corrected size, a tertiary collision determination step may be performed to determine whether the collision occurs between the moving spheres by approximating the trajectories of the moving spheres to linear sections more than m linear sections. Alternatively, according to another embodiment, the tertiary collision determination step for the moving spheres may be performed in well-known actual trajectories of the moving spheres with the actual size of the moving spheres without performing the trajectory approximation and the size correction for the moving spheres.

The tertiary collision determination step for the moving spheres may include the Voronoi diagram face calculation step, the collision prediction object extraction step, and the collision determination step for the moving spheres described above.

Figure 19:
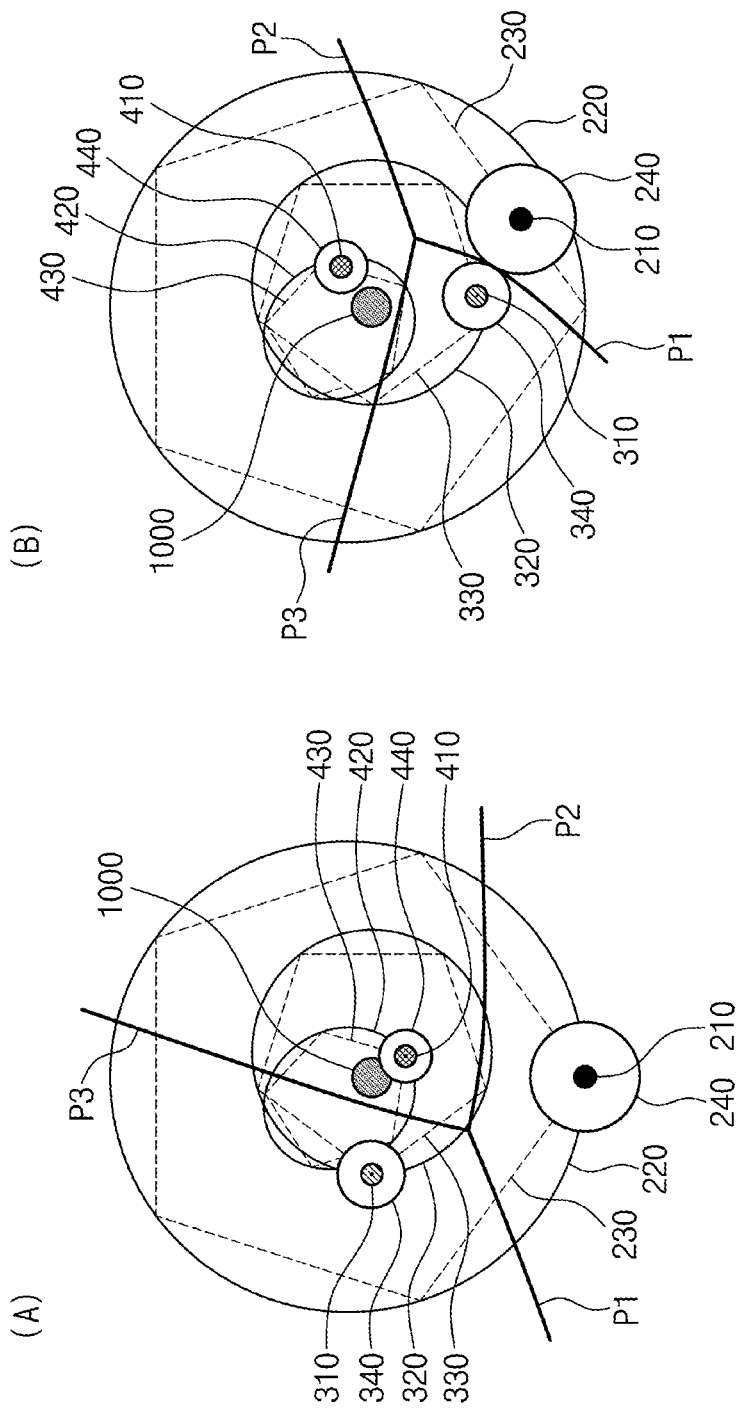
FIG. 19 is a view for explaining in detail a primary collision determination step for moving spheres shown in FIG. 18.
Figure 20:
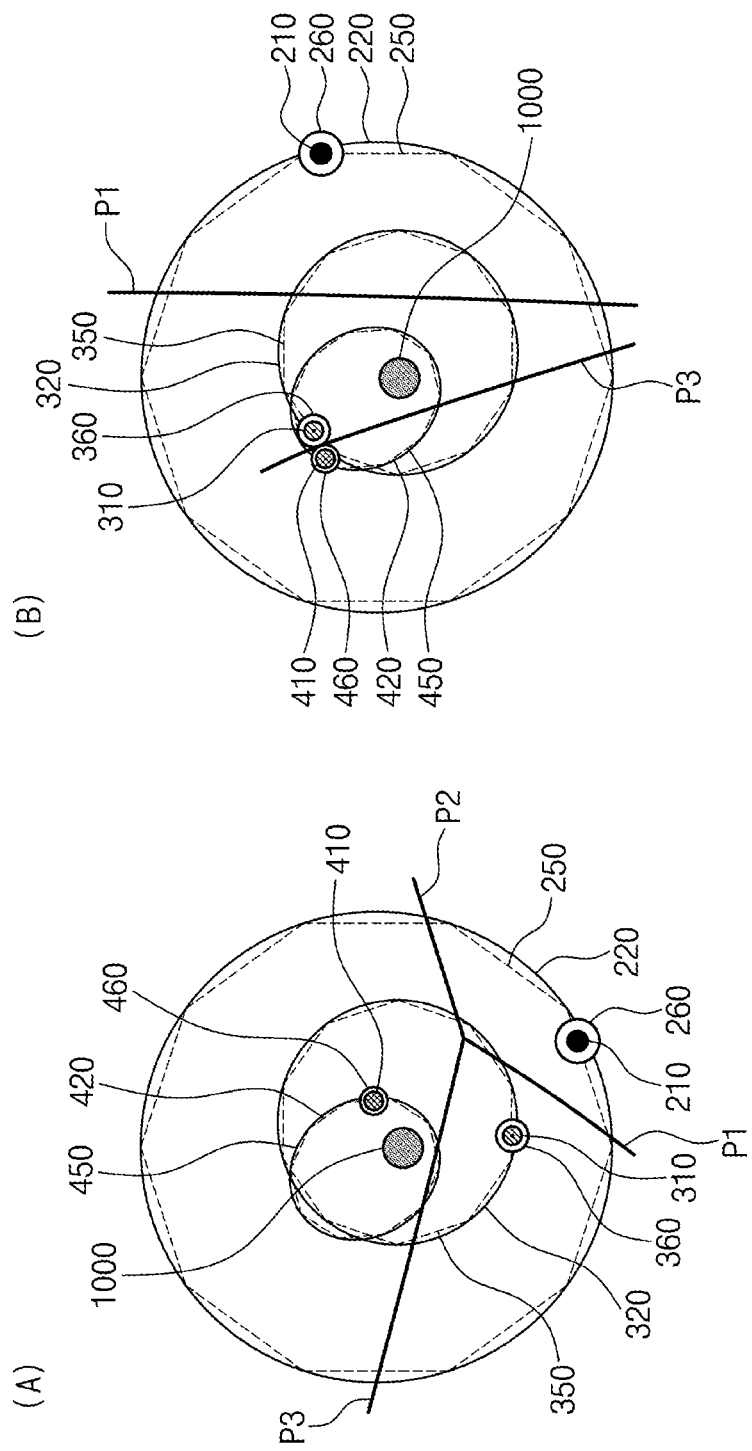
FIG. 20 is a view for explaining in detail a secondary collision determination step for moving spheres shown in FIG. 18.
Figure 21:
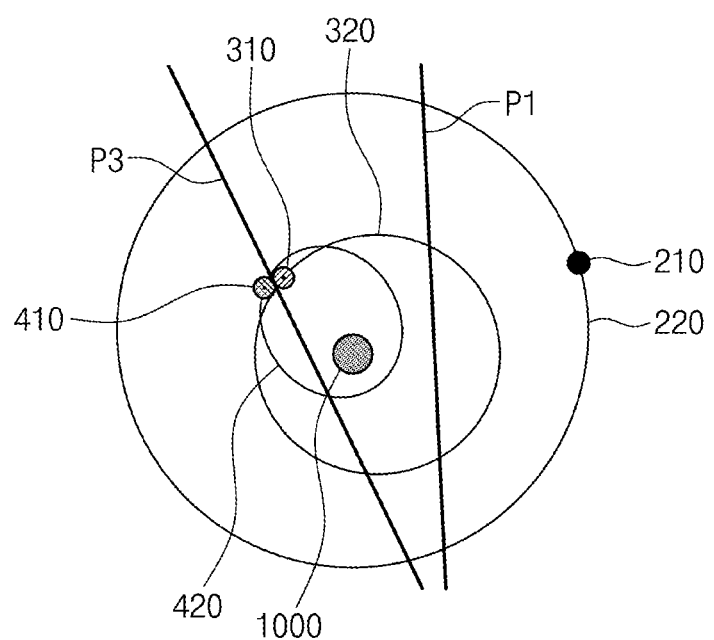
FIG. 21 is a view for explaining in detail a tertiary collision determination step for moving spheres shown in FIG. 18.

FIG. 19 is a view for explaining in detail the primary collision determination step for the moving spheres shown in FIG. 18, FIG. 20 is a view for explaining in detail the secondary collision determination step for moving spheres shown in FIG. 18, and FIG. 21 is a view for explaining in detail a tertiary collision determination step for moving spheres shown in FIG. 18.

First, referring to FIG. 19, first to third trajectories 220, 320 and 420 are approximated to five linear sections at the first reference time point A to create first approximate trajectories 230, 330 and 430 of the first to third moving spheres 210, 310 and 410. The sizes of the first to third moving spheres 210, 310 and 410 are primarily corrected by reflecting an error between the first to third trajectories 220, 320, and 420 and the first approximate trajectories 230, 330 and 430 of the first to third moving spheres 210, 310 and 410.

Then, the faces P1, P2 and P3 of the Voronoi diagram are calculated by computing the Voronoi diagram for the first to third moving spheres 240, 340 and 440 having the primarily corrected size.

Among the first to third moving spheres 240, 340 and 440 having the primarily corrected size, the second and third moving spheres 340 and 440 having the primarily corrected size and nearest to the face P3 of the Voronoi diagram may be extracted as collision prediction objects.

The collision may be determined by analyzing the moving speed of the second and third moving spheres 340 and 440 having the primarily corrected size and extracted as the collision prediction objects. According to an embodiment, it is determined that the collision does not occur between the second and third moving spheres 340 and 440 having the primarily corrected size.

Thereafter, the collision determination between the first to third moving spheres 240, 340 and 440 having the primarily corrected size may be repeatedly performed at predetermined periods.

At the second reference time point B, the first and second moving spheres 240 and 340 having the primarily corrected size may be extracted as the collision prediction objects, and the moving speed of the first and second moving spheres 240 and 340 having the primarily corrected size may be analyzed to determine whether the collision occurs. According to an embodiment, it is determined that the first and second moving spheres 240 and 340 having the primarily corrected size may collide with each other.

Referring to (A) of FIG. 20, when it is determined that the first and second moving spheres 240 and 340 having the primarily corrected size collide with each other, the first to third trajectories 220, 320 and 420 may be approximated to 10 linear sections to create second approximate trajectories 250, 350 and 450 of the first to third moving spheres 210, 310 and 410. The size of the first to third moving spheres 240, 340 and 440 having the primarily corrected size may be secondarily corrected by reflecting an error between the first to third trajectories 220, 320 and 420 and the second approximate trajectories 250, 350 and 450 of the first to third moving spheres 210, 310 and 410.

The faces P1, P2, and P3 of the Voronoi diagram may be calculated by computing the Voronoi diagram for the first to third moving spheres 260, 360 and 460 having the secondarily corrected size.

Among the first to third moving spheres 260, 360 and 460 having the secondarily corrected size, the first and second moving spheres 260 and 360 having the secondarily corrected size and nearest to the face P1 of the Voronoi diagram may be extracted as collision prediction objects.

The collision may be determined by analyzing the moving speed of the first and second moving spheres 260 and 360 having the secondarily corrected size. According to an embodiment, it is determined that the first and second moving spheres 260 and 360 having the secondarily corrected size do not collide with each other.

Thereafter, the collision determination between the first to third moving spheres 240, 340 and 440 having the secondarily corrected size may be repeatedly performed at predetermined periods.

At the third reference time point B, the second and third moving spheres 360 and 460 having the secondarily corrected size may be extracted as the collision prediction objects, and the collision may be determined by analyzing the moving speed of the second and third moving spheres 360 and 460 having the secondarily corrected size. According to an embodiment, it is determined that the second and third moving spheres 360 and 460 having the secondarily corrected size may collide with each other.

When it is determined that the second and third moving spheres 360 and 460 having the secondarily corrected size collide with each other, a tertiary collision determination step is performed for the moving spheres.

Referring to FIG. 21, at the third reference time point, the second and third moving spheres 310 and 410 may be extracted as the collision prediction objects, and the collision may be determined by analyzing the moving speed of the second and third moving spheres 310 and 410. According to an embodiment, it is determined that the second and third moving spheres 310 and 410 may collide with each other.

When comparing the results between (B) of FIG. 20 and FIG. 21, the result of the secondary collision determination for the moving spheres 310 and 410 coincides with the result of the tertiary collision determination for the moving spheres 310 and 410 that determine the collision of the objects in the actual trajectory.

Therefore, the method for predicting the collision of the moving bodies 210, 310 and 410 having the known moving paths according to an embodiment of the present invention can reduce the overall calculation amount required for predicting the collision and can improve the collision prediction speed, thereby improving the accuracy of collision prediction.

Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

INDUSTRIAL APPLICABILITY

The present invention provides a method for efficiently analyzing collisions and conflict between moving bodies such as aircraft, ships, submarines, satellites, drones, and automobiles.

The invention claimed is:

1. A method for predicting and avoiding collision between moving bodies, the method comprising:

creating objects by modeling a shape of each of multiple moving bodies;

creating two-dimensional circles by modeling the objects by using size information of the objects;

modeling the two-dimensional circles into moving disks by using at least one of moving speeds of the moving bodies, a monitoring time window for the moving bodies, and size information of the two-dimensional circles;

computing a Voronoi diagram between the moving disks to calculate edges of the Voronoi diagram; and during the monitoring time window for the moving bodies, calculating a flipping event in which at least one of the edges of the Voronoi diagram is converted into a vertex and then converted again into an edge, and a collision event for predicting a collision between a pair of moving disks defining an edge of the Voronoi diagram, and calculating whether actual collisions occur between moving disks triggering the flipping event and between moving disks triggering the collision event, in a chronological order of an occurrence time of the flipping event and the collision event.

2. The method for claim 1, further comprising updating information of the Voronoi diagram where the flipping event occurs, wherein the updating of the information of the Voronoi diagram where the flipping event occurs includes:

redefining the Voronoi diagram with respect to the moving disks defining edges of the Voronoi diagram where the flipping event occurs and edges of other Voronoi diagrams connected thereto;

recalculating an occurrence time of the flipping event in relation to the edges of the Voronoi diagram where the flipping event occurs and the edges of other Voronoi diagram connected thereto;

recalculating an occurrence time of the collision event between a pair of moving disks defining the edge of the Voronoi diagram where the flipping event occurs; and recalculating the actual collision between the moving disks triggering the flipping event and between the moving disks triggering the collision event, in a chronological order of the recalculated occurrence time of the flipping event and the collision event, and wherein an information update of the Voronoi diagram where the flipping event occurs is repeated during the monitoring time window for the moving bodies, and is terminated when neither the flipping event nor the collision event occurs.

3. The method for claim 1, further comprising updating information of the Voronoi diagram where the collision event occurs, wherein the updating of the information of the Voronoi diagram where the collision event occurs includes:

recalculating an occurrence time of the collision event between the pair of moving disks triggering the collision event and between another pair of moving disks defining the edges of the Voronoi diagram;

recalculating an occurrence time of the flipping event with respect to the edge of the Voronoi diagram defined by a pair of moving disks triggering the collision event, the edges of the Voronoi diagram defined by another pair of moving disks different from the pair of the moving disks triggering the collision event, and the edges of the Voronoi diagram defined by the another pair of moving disks; and recalculating the actual collision between the moving disks triggering the collision event and between the moving disks triggering the flipping event, in a chronological order of the recalculated occurrence time of the collision event and the flipping event, and wherein an information update of the Voronoi diagram where the collision event occurs is repeated during the monitoring time window for the moving bodies, and is terminated when neither the flipping event nor the collision event occurs.

4. The method for claim 1, wherein the creating of the two-dimensional circle includes generating a circumscribed circle that circumscribes each of the objects.

5. The method for claim 1, wherein the creating of the moving disks includes determining a radius of the moving disks by Equation 1

$$R = r + V_{max} \cdot t_p + \delta \qquad \text{[Equation 1]}$$

(where R is a radius of moving disks, r is a radius of a two-dimensional circle, $V_{max}$ is a maximum velocity of a moving body, $t_p$ is a calculation time for predicting collision and conflict of moving bodies, and $\delta$ is a safety factor).

6. The method for claim 1, wherein the calculating of the actual collision between the moving disks includes determining whether the objects of the moving disks collide with each other.

7. The method for claim 6, wherein the determining whether the objects of the moving disks collide with each other includes modeling the objects by a plurality of inscribed circles inscribed in each of the objects, and determining the collision of the moving bodies in a unit of the inscribed circle.

8. The method for claim 6, wherein the determining whether the objects of the moving disks collide with each other includes:

approximating a nonlinear moving path of the moving bodies into a plurality of linear moving paths;

modeling the objects into a geometric shape that includes objects turned at a turning position and a turning angle when the turning position and the turning angle of the moving bodies on the approximated linear moving paths are known; and determining the collision between the geometric shapes.

9. The method for claim 1, wherein the moving bodies move along their respective trajectories, and calculating the actual collision between the moving disks includes:

extracting the moving disks nearest to the edge of the Voronoi diagram as collision prediction objects; and determining the collision of the collision prediction objects by analyzing moving speeds of the collision prediction objects.

10. The method for claim 9, wherein, in the calculating of the actual collision between the moving disks, when radiuses of a first collision prediction object A and a second collision prediction object B of the collision prediction objects are $r_A$ and $r_B$, respectively, center point positions of the first collision prediction object A and the second collision prediction object B from a first reference time point are $(A_x, A_y)$ and $(B_x, B_y)$, respectively, and velocities of the first collision prediction object A and the second collision prediction object B moving along the trajectory are $V_A = (v_x, v_y)$, $U_B = (u_x, u_y)$, respectively, if an estimated position of the first collision prediction object A is A(t) and an estimated position of the second collision prediction object B is B(t) after t time elapses, the collision between the first collision prediction object A and the second collision prediction object B is calculated through Equation 2 below $$d(t) = |A(t) - B(t)| = \sqrt{(w_x^2 + w_y^2)t^2 + 2(w_x r_x + w_y r_y)t + (r_x^2 + r_y^2)}$$

($r_x$ is $A_x - B_x$, $r_y$ is $A_y - B_y$, $r_z$ is $A_z - B_z$, $w_x$ is $v_x - u_x$, $w_y$ is $v_y - u_y$, $w_z$ is $v_z - u_z$). [Equation 2]

11. A non-transitory computer-readable recording medium that stores a program for executing a method for predicting and avoiding collisions between moving bodies according to claim 1.

12. A method for predicting and avoiding collision between moving bodies, the method comprising:
creating objects by modeling a shape of each of multiple moving bodies;
modeling the objects into three-dimensional spheres by using size information of the objects;
creating moving spheres by modeling the three-dimensional spheres using at least one of moving speeds of the moving bodies, a monitoring time window for the moving bodies, and size information of the three-dimensional spheres;
computing a Voronoi diagram between the moving spheres to calculate faces, edges and vortexes of the Voronoi diagram; and
during the monitoring time window for the moving bodies, calculating an edge flipping event in which the edges of the Voronoi diagram are converted into the faces of the Voronoi diagram, a face flipping event in which the faces of the Voronoi diagram are converted into the edges of the Voronoi diagram, and a collision event for predicting a collision between a pair of moving spheres defining a face of the Voronoi diagram, and calculating whether actual collisions occur between the moving spheres triggering the edge flipping event, between moving spheres triggering the face flipping event, and between moving spheres triggering the collision event, in a chronological order of an occurrence time of the edge flipping event, the face flipping event and the collision event.

13. The method for claim 12, further comprising updating information of the Voronoi diagram where the edge flipping event occurs,
wherein the updating of the information of the Voronoi diagram where the edge flipping event occurs includes:
redefining the Voronoi diagram with respect to the moving spheres that define the face of the Voronoi diagram after the edge flipping event occurs and the edges of the Voronoi diagram that abut vertices and make up the face;
recalculating an occurrence of the edge flipping event with respect to the edges of the Voronoi diagram that abut the vertices;
recalculating an occurrence of the face flipping event with respect to the face of the Voronoi diagram after the edge flipping event occurs;
recalculating an occurrence of the collision event between the moving spheres defining the face of the Voronoi diagram created after the recalculation of the occurrence of the edge flipping event; and recalculating the actual collision between the moving spheres triggering the recalculated edge flipping event, between the moving spheres triggering the recalculated face flipping event and between the moving spheres triggering the recalculated collision event, in a chronological order of the recalculated occurrence time of the edge flipping event, the face flipping event and the collision event, and
wherein the updating of the information of the Voronoi diagram where the edge flipping event occurs is repeated during the monitoring time window of the moving bodies, and is terminated when the edge flipping event, the face flipping event and the collision event do not occur.

14. The method for claim 12, further comprising updating information of the Voronoi diagram where the face flipping event occurs,
wherein the updating of the information of the Voronoi diagram where the face flipping event occurs includes:
redefining the Voronoi diagram with respect to the moving spheres that define the edge of the Voronoi diagram where the face flipping event occurs and the edges of the Voronoi diagram that abut the edge of the Voronoi diagram where the face flipping event occurs;
recalculating an occurrence of the edge flipping event with respect to the edge of the Voronoi diagram where the face flipping event occurs and the edge of the Voronoi diagram connected to the edge of the Voronoi diagram where the face flipping event occurs;
recalculating an occurrence of the face flipping event with respect to the faces of the Voronoi diagram connected to the edge of the of the Voronoi diagram where the face flipping event occurs;
recalculating an occurrence of the collision event between the moving spheres defining the face of the Voronoi diagram created after the recalculation of the occurrence of the edge flipping event; and
recalculating the actual collision between the moving spheres triggering the recalculated edge flipping event, between the moving spheres triggering the recalculated face flipping event and between the moving spheres triggering the recalculated collision event, in a chronological order of the recalculated occurrence time of the edge flipping event, the face flipping event and the collision event, and
wherein the updating of the information of the Voronoi diagram where the edge flipping event occurs is repeated during the monitoring time window of the moving bodies, and is terminated when the edge flipping event, the face flipping event and the collision event do not occur.

15. The method for claim 12, further comprising updating information of the Voronoi diagram where the collision event occurs,
wherein the updating of the information of the Voronoi diagram where the collision event occurs includes:
recalculating an occurrence of the collision event with respect to a pair of moving spheres triggering the collision event and other moving spheres defining faces of the Voronoi diagram in association with the pair of moving spheres;
recalculating an occurrence of the edge flipping event and the face flipping event with respect to the face of the Voronoi diagram which abuts vertices of the Voronoi diagram included in the faces of the Voronoi diagram defined by the pair of moving spheres and other moving spheres or with respect to the edge of the Voronoi diagram; and recalculating the actual collision between the moving spheres triggering the recalculated collision event, between the moving spheres triggering the recalculated edge flipping event and between the moving spheres triggering the recalculated face flipping event, in a chronological order of the recalculated occurrence time of the collision event, the edge flipping event, and the face flipping event, and wherein the updating of the information of the Voronoi diagram where the collision event occurs is repeated during the monitoring time window of the moving bodies, and is terminated when the edge flipping event, the face flipping event and the collision event do not occur.

16. The method for claim 12, wherein the creating of the three-dimensional sphere includes creating a sphere that circumscribes each of the objects.

17. The method for claim 12, wherein the creating of the moving spheres includes determining a radius of the moving spheres by Equation 1

$$R = r + V_{max} \cdot t_p + \delta \quad \text{[Equation 1]}$$

(where R is a radius of moving spheres, r is a radius of a three-dimensional sphere, $V_{max}$ is a maximum velocity of a moving body, $t_p$ is a calculation time for predicting collision and conflict of moving bodies, and $\delta$ is a safety factor).

18. The method for claim 12, wherein the calculating of the actual collision between the moving spheres further includes determining whether the objects of the moving spheres collide with each other.

19. The method for claim 18, wherein the determining whether the objects of the moving spheres collide with each other includes modeling the objects with a plurality of inscribed spheres inscribed in each of the objects, and predicting collision of the moving bodies in a unit of the inscribed sphere.

20. The method for claim 12, wherein the determining whether the objects of the moving spheres collide with each other includes:

approximating a nonlinear moving path of the moving bodies into a plurality of linear moving paths;

modeling the objects into a geometric shape that includes objects turned at a turning position and a turning angle when the turning position and the turning angle of the moving bodies on the approximated linear moving paths are known; and predicting the collision between the geometric shapes.

21. The method for claim 12, wherein the moving bodies move along their respective trajectories, and the calculating of the actual collision between the moving spheres includes extracting the spheres nearest to the face of the Voronoi diagram as collision prediction objects and analyzing a moving speed of the collision prediction objects to determine whether the collision prediction objects collide with each other.

22. The method for claim 21, further comprising:

a primary collision determination step of creating a first approximate trajectory by approximating the trajectories of the moving spheres into n linear sections, primarily correcting sizes of the moving spheres by reflecting an error between the trajectories of the moving spheres and the first approximate trajectory, and determining whether the moving spheres having the sizes, which are primarily corrected, collide with each other; and a secondary collision determination step of, when the collision occurs between the moving spheres having the sizes, which are primarily corrected, in the primary collision determination step for the moving spheres, creating a second approximate trajectory by approximating the trajectories of the moving spheres into m linear sections greater than the n linear sections, secondarily correcting the sizes of the moving spheres by reflecting an error between the trajectories of the moving spheres and the second approximate trajectory, and determining whether the moving spheres having the sizes, which are secondarily corrected, collide with each other, and wherein each of the primary and secondary collision determination steps for the moving spheres includes:

calculating faces of the Voronoi diagram by calculating a diagram between the moving spheres having the corrected sizes;

extracting the moving spheres nearest to the face of the Voronoi diagram as collision prediction objects from among the moving spheres having the corrected size; and determining the collision by analyzing moving speeds of the collision prediction objects.

23. The method for claim 21, wherein, in the calculating of the actual collision between the moving spheres, when radiuses of a first collision prediction object A and a second collision prediction object B of the collision prediction objects are $r_A$ and $r_B$, respectively, center point positions of the first collision prediction object A and the second collision prediction object B from a first reference time point are $(A_x, A_y, A_z)$ and $(B_x, B_y, B_y)$, respectively, and velocities of the first collision prediction object A and the second collision prediction object B moving along the trajectory are $V_A = (v_x, v_y, v_z)$, $U_B = (u_x, u_y, u_z)$, respectively, if an estimated position of the first collision prediction object A is A(t) and an estimated position of the second collision prediction object B is B(t) after t time elapses, the collision between the first collision prediction object A and the second collision prediction object B is calculated through Equation 2 below $$d(t) = |A(t) - B(t)| \\ \sqrt{(w_x^2 + w_y^2 + w_z^2)t^2 + 2(w_x r_x + w_y r_y + w_z r_z)t + (r_x^2 + r_y^2 + r_z^2)} \quad \text{[Equation 2]}$$

($r_x$ is $A_x - B_x$, $r_y$ is $A_y - B_y$, $r_z$ is $A_z - B_z$, $w_x$ is $v_x - u_x$, $w_y$ is $v_y - u_y$, $w_z$ is $v_z - u_z$).

* * * * *